(12) United States Patent
Davis

(10) Patent No.: US 9,839,919 B2
(45) Date of Patent: *Dec. 12, 2017

(54) CHARGED ENGINEERED POLYMER BEADS/BUBBLES FUNCTIONALIZED WITH MOLECULES FOR ATTRACTING AND ATTACHING TO MINERAL PARTICLES OF INTEREST FOR FLOTATION SEPARATION

(71) Applicant: CiDRA Corporate Services Inc., Wallingford, CT (US)

(72) Inventor: Michael A. Davis, Glastonbury, CT (US)

(73) Assignee: CIDRA CORPORATE SERVICES INC., Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/400,697

(22) PCT Filed: May 22, 2013

(86) PCT No.: PCT/US2013/042202
§ 371 (c)(1),
(2) Date: Nov. 12, 2014

(87) PCT Pub. No.: WO2013/177267
PCT Pub. Date: Nov. 28, 2013

(65) Prior Publication Data
US 2015/0151308 A1    Jun. 4, 2015

Related U.S. Application Data

(60) Provisional application No. 61/650,210, filed on May 22, 2012.

(51) Int. Cl.
*B04B 5/10*    (2006.01)
*B03D 1/14*    (2006.01)
(Continued)

(52) U.S. Cl.
CPC ....... *B03D 1/1437* (2013.01); *B01D 21/0009* (2013.01); *B03C 5/02* (2013.01);
(Continued)

(58) Field of Classification Search
CPC ...... B03D 1/4734; B03D 1/018; B03D 1/023; B03D 1/016; B03D 1/14; B03C 5/00;
(Continued)

(56) References Cited

U.S. PATENT DOCUMENTS 6,219,137 B1    4/2001    Vo-Dinh
2003/0015428 A1    1/2003    Becker et al.
(Continued)

FOREIGN PATENT DOCUMENTS

WO    2004064997    8/2004
WO    2010093793    8/2010

*Primary Examiner* — Joseph C Rodriguez
*Assistant Examiner* — Kalyanavenkateshware Kumar
(74) *Attorney, Agent, or Firm* — Ware, Fressola, Maguire & Barber LLP

(57) ABSTRACT

Apparatus is providing featuring a synthetic bead having a solid-phase body with a surface, and being configured with a predetermined electric charge so as to respond to a corresponding predetermined electric field; and a plurality of molecules attached to at least part of the surface, the molecules comprising a functional group selected for attracting and attaching one or more mineral particles of interest to the molecules. Some combination of the solid-phase body or the surface may be configured from a polymer. The polymer may be polyethylenimine. The polyethylenimine may be engineered or configured to be highly charged so as to be used to collect the mineral particles of interest and then manipulated through and by the corresponding predetermined electric field.

41 Claims, 13 Drawing Sheets

(51) Int. Cl.
  *B01D 21/00*   (2006.01)
  *B03D 1/02*   (2006.01)
  *B03C 5/02*   (2006.01)
  *B03D 1/018*   (2006.01)
  *B03C 5/00*   (2006.01)

(52) U.S. Cl.
  CPC ............ *B03D 1/018* (2013.01); *B03D 1/023* (2013.01); *B03C 5/00* (2013.01); *B03C 2201/18* (2013.01)

(58) Field of Classification Search
  CPC ......... B03C 5/02; B03C 1/01; B01D 21/0009; B01D 15/02; B01D 37/02; B01D 39/00
  USPC .... 209/170, 214, 225, 232, 127.1, 128–129, 209/212, 213, 163–167, 172–173
  See application file for complete search history.

(56) References Cited

U.S. PATENT DOCUMENTS

| | | |
|---|---|---|
| 2004/0173506 A1 | 9/2004 | Doktycz et al. |
| 2005/0196856 A1 | 9/2005 | Harrold et al. |
| 2010/0059449 A1 | 3/2010 | Grass et al. |
| 2012/0029120 A1 | 2/2012 | Soane et al. |
| 2012/0076694 A1 | 3/2012 | Morozov et al. |
| 2012/0091000 A1 | 4/2012 | Taylor et al. |

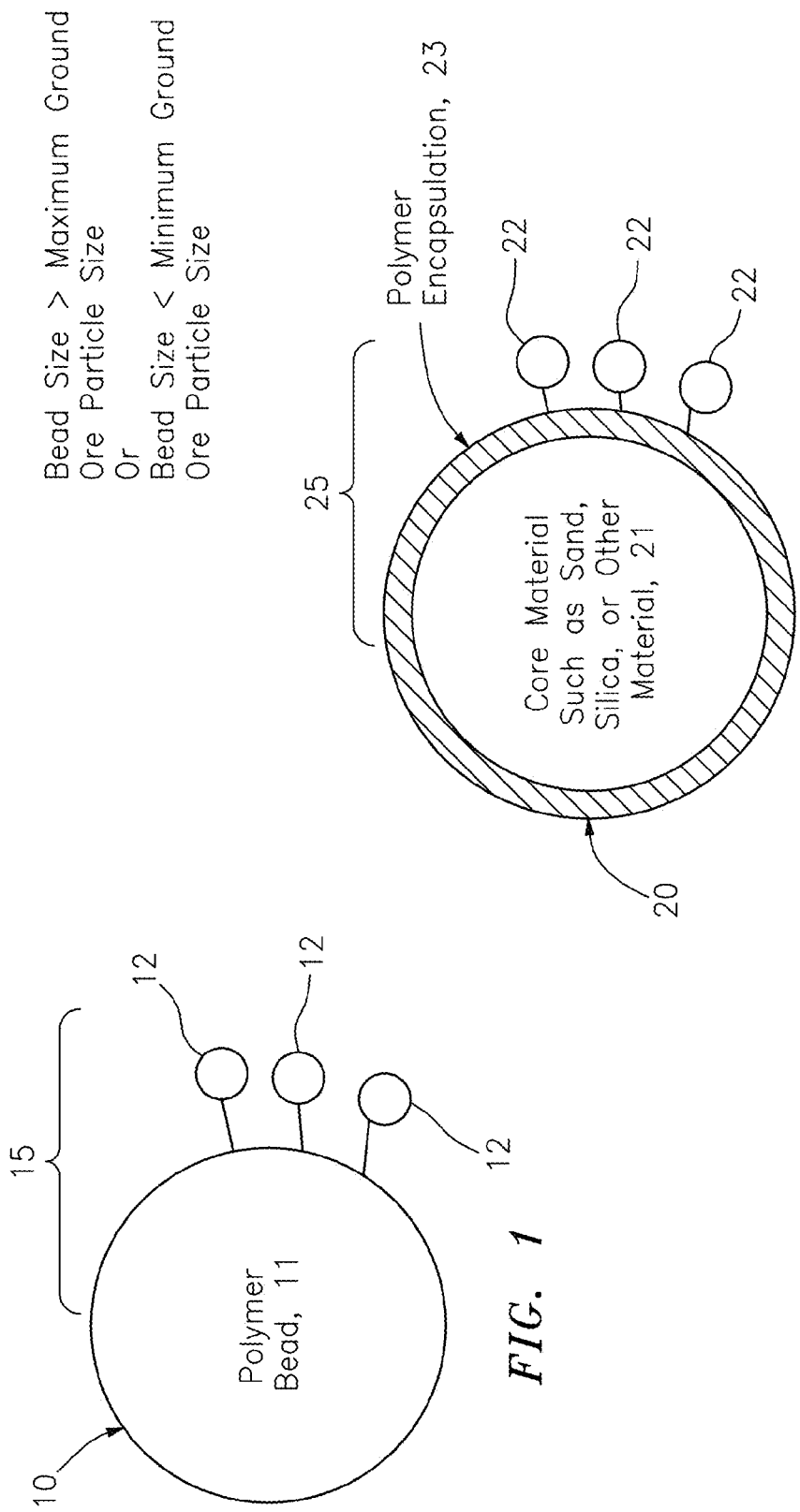

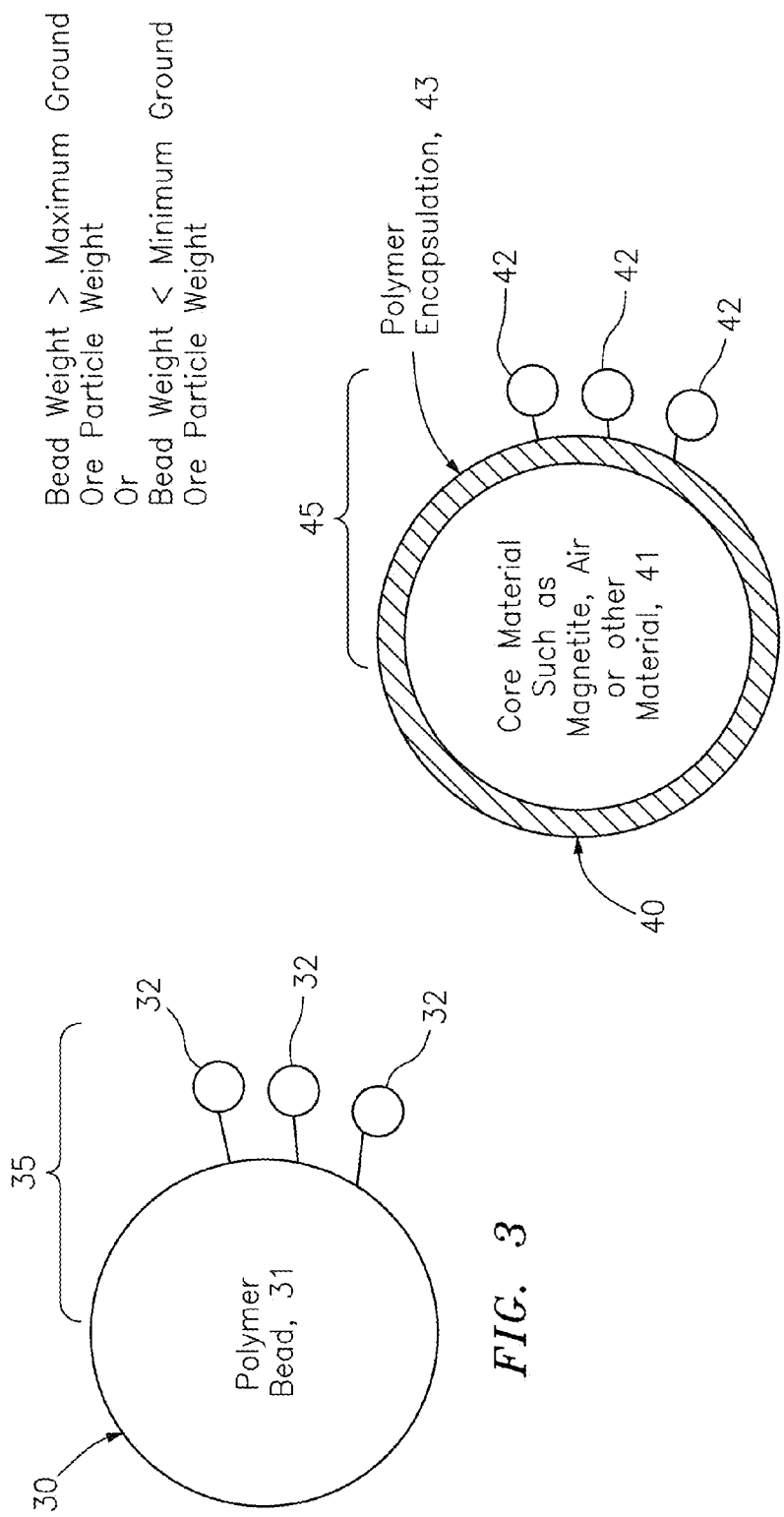

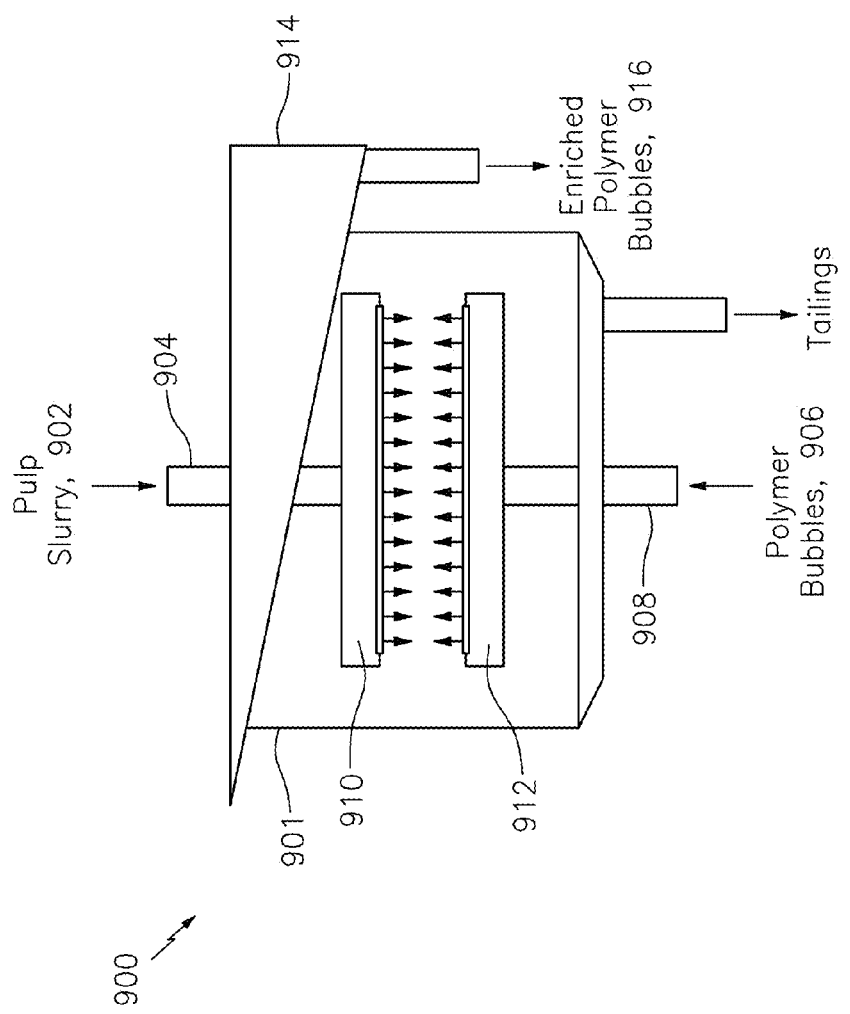
FIG. 12: Alternative Flotation cell or Column

CHARGED ENGINEERED POLYMER BEADS/BUBBLES FUNCTIONALIZED WITH MOLECULES FOR ATTRACTING AND ATTACHING TO MINERAL PARTICLES OF INTEREST FOR FLOTATION SEPARATION

CROSS-REFERENCE TO RELATED APPLICATIONS

The present application corresponds to International Patent Application Serial No. PCT/US2013/042202, filed 22 May 2013, which claims the benefit of U.S. Provisional Patent Application No. 61/650,210, filed 22 May 2012, which is incorporated by reference herein in its entirety.

This application is also related to a family of nine PCT applications, which were all concurrently filed on 25 May 2012, as follows:
PCT application no. PCT/US12/39528, entitled "Flotation separation using lightweight synthetic bubbles and beads;"
PCT application no. PCT/US12/39524, entitled "Mineral separation using functionalized polymer membranes;"
PCT application no. PCT/US12/39540, entitled "Mineral separation using sized, weighted and magnetized beads;"
PCT application no. PCT/US12/39576, entitled "Synthetic bubbles/beads functionalized with molecules for attracting or attaching to mineral particles of interest;"
PCT application no. PCT/US12/39591, entitled "Method and system for releasing mineral from synthetic bubbles and beads;"
PCT application no. PCT/US/39596, entitled "Synthetic bubbles and beads having hydrophobic surface;"
PCT application no. PCT/US/39631, entitled "Mineral separation using functionalized filters and membranes;"
PCT application no. PCT/US12/39655, entitled "Mineral recovery in tailings using functionalized polymers;" and
PCT application no. PCT/US12/39658, entitled "Techniques for transporting synthetic beads or bubbles In a flotation cell or column," all of which are incorporated by reference in their entirety.

This application also related to PCT application no. PCT/US13/28303, filed 28 Feb. 2013, entitled "Method and system for flotation separation in a magnetically controllable and steerable foam," which is also hereby incorporated by reference in its entirety.

The present application is also related to U.S. Provisional Patent Application No. 61/822,679, filed 13 May 2013, which is incorporated by reference herein in its entirety.

BACKGROUND OF THE INVENTION

1. Technical Field

This invention relates generally to a method and apparatus for separating valuable material from unwanted material in a mixture, such as a pulp slurry.

2. Description of Related Art

In many industrial processes, flotation is used to separate valuable or desired material from unwanted material. Traditionally, the flotation process utilizes a specific mineral collector with a hydrophobic tail which allows the collector-mineral pair to attach to an air bubble.

In particular, current flotation processes typically use bubbles to provide a separation capability by utilizing the buoyancy of air. In such processes, a mixture of water, valuable material, unwanted material, chemicals and air may be placed into a flotation cell. Through chemical reactions desired particles are attached to a bubble, and the bubble is utilized to float the particles to the top of a tank while the other undesired material sinks to the bottom. The chemicals are used to make the desired material hydrophobic, and the air is used to carry the material to the surface of the flotation cell. When the hydrophobic material and the air bubbles collide they become attached to each other. The bubble rises to the surface carrying the desired material with it.

However, the performance of the flotation cell is dependent on the air bubble surface area flux in the collection zone of the cell. The air bubble surface area flux is dependent on the size of the bubbles and the air injection rate. Controlling the air bubble surface area flux and the bubble size distribution has traditionally been very difficult. This is a multivariable control problem and there are no dependable real time feedback mechanisms to use for control.

For these reasons, there is a need in the industry to provide a better way to separate valuable material from unwanted material, e.g., including in such a flotation cell, so as to eliminate problems associated with using air bubbles in such a separation process.

Furthermore, different methods have been developed which leverage engineered materials for separation. For example, through the use of an engineered material that attracts the particles a variety of separation means can be used, which can be much more easily controlled and can lead to a more efficient recovery process.

SUMMARY OF THE INVENTION

According to the present invention, a technique of using an electric field is provided, e.g. in relation to a flotation process used to separate valuable or desired material from unwanted material.

According to the present invention, a mineral collector can be embedded in a polymer that has a strong electric charge. Polymers such as, for example, polyethylenimine which are engineered to be highly charged can be used to collect a mineral of interest and then easily manipulated through electric fields. In one example, a flotation tank may be configured between a top negatively charged metal plate and a bottom positively charged metal plate and filled with a solution or slurry having positively charged polymers, embedded collectors, and a mineral slurry. The top metal plate with the new negative charge is configured, arranged or placed over the solution or slurry in the flotation tank, and the bottom metal plate with the positive charge is configured, arranged or located under the solution or slurry.

The solution or slurry of charge polymers configured with the embedded collectors and the mineral slurry is then separated due to the electric field created by the top and bottom charged plates, so that the positively charged polymers will migrate to the top of the flotation tank where they, along with the mineral of interest, can be collected.

A key advantage of this charge based separation process is that the location and speed of the polymers/minerals can be easily manipulated. A larger charge or voltage between the plates will attract lower charged particles and will cause the particles to move more quickly through the slurry. Additionally once the plates are charged they will act like a capacitor since the polymers never reach the plates and therefore the charge will not dissipate. The can potentially lead to a very low energy separation process.

According to some embodiment, the present invention may take the form of apparatus featuring a synthetic bead having a solid-phase body with a surface, and being configured with a predetermined electric charge so as to respond to a corresponding predetermined electric field; and a plurality of molecules attached to at least part of the surface, the molecules comprising a functional group selected for attracting and attaching one or more mineral particles of interest to the molecules.

Some combination of the solid-phase body or the surface may be configured from a polymer.

The polymer may be polyethylenimine, including one engineered or configured to be highly charged so as to be used to collect the mineral particles of interest and then manipulated through and by the corresponding predetermined electric field.

The apparatus may also include a flotation tank configured between a top charged metal plate having a first polarity and a bottom charged metal plate having a second polarity opposite to the first polarity, and also configured to be filled with and contain a solution or slurry having synthetic beads in the form of charged polymers having the first polarity, embedded collectors, and a mineral slurry having the mineral particles of interest, the top charged metal plate and the bottom charged metal plate being configured to generate the corresponding predetermined electric field in the mineral slurry in order to manipulate the charged polymers.

The top charged metal plate and the bottom charged metal plate may be configured to cause the charged polymers, along with the one or more mineral particles of interest that may be attached thereto, to migrate through the mineral slurry to the top charged metal plate, based at least partly on the predetermined electric field.

The top metal plate may be configured with a negative charge and configured, arranged or placed over the flotation tank, the bottom charged metal plate is configured with a positive charge and configured, arranged or located under the flotation tank, and the charged polymers are configured with a corresponding positive charge.

In effect, the present invention provides new and unique mineral separation techniques using synthetic beads or bubbles functionalized with molecules for attracting or attaching desired and/or selected mineral particles of interest, including electrically charged, size-based, weight-based, magnetic-based and/or density-based polymer beads or bubbles. The polymer beads or bubbles may also be configured to have some combination of these characteristics or features, e.g., including combinations of two characteristics or features like electrically charged and size-based, or electrically charged and weight-based, or electrically charged and magnetic-based, or electrically charged and density-based polymer beads or bubbles; or including combinations of three characteristics or features like electrically charged, size-based and weight-based, or electrically charged, size-based and magnetic-based, or electrically charged, size-based and density-based, etc., polymer beads or bubbles, or including combinations of four or five characteristics or features.

For the purpose of describing the present invention, the synthetic bead or bubble may also be referred to herein either as a synthetic bead or as a synthetic bubble.

According to some embodiments of the present invention, the solid-phase body may be made of a synthetic material comprising the molecules. By way of example, the synthetic material may be selected from a group consisting of polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin and polydimethylsiloxane.

According to some embodiments of the present invention, the solid-phase body may include a shell providing the surface, the shell being made of a synthetic material comprising the molecules.

According to some embodiments of the present invention, the synthetic bead may be configured to attract or attach to the mineral particles, e.g., in an aqueous mixture, and the shell may comprise an interior part arranged to encapsulate a gaseous element such that the synthetic bead has a density less than the aqueous mixture.

According to some embodiments of the present invention, the synthetic bead may be configured to attract or attach to the mineral particles, e.g., in an aqueous mixture, and the shell may comprise an interior part arranged to encapsulate a liquid having a chemical property different from the aqueous mixture.

According to some embodiments of the present invention, the synthetic bead may be configured to attract or attach to the mineral particles, e.g., in an aqueous mixture, and the shell may comprise an interior part arranged to encapsulate a solid-phase material different from the synthetic shell, and the solid-phase material may be selected to control the density of the synthetic bead relative to the density of the aqueous mixture.

According to some embodiments of the present invention, the shell may comprise an interior part configured to encapsulate a magnetic material.

According to some embodiments of the present invention, the shell may comprise an interior part configured to encapsulate a solid-phase material different from the synthetic material.

According to some embodiments of the present invention, the solid-phase body may comprise a core and a coating over the core for providing the surface, and the coating may be made of a synthetic material and the core is made of a core material different from the synthetic material. By way of example, the core material may be selected from a group consisting of glass, ceramic, metal and a polymer that is different from the synthetic material. The term "polymer" in this specification is understood to mean a large molecule made of many units of the same or similar structure linked together.

According to some embodiments of the present invention, the surface of the solid-phase body may comprise physical structures configured to trap the mineral particles. By way of example, the physical structures may include grooves or dents or hair-like structures.

According to some embodiments of the present invention, the mineral particles may have a maximum size and the solid-phase body may have a body size greater than the maximum size. Alternatively, the mineral particles may have a minimum size and the solid-phase body may have a body size smaller than the minimum size.

According to some embodiments of the present invention, the functional group may be anionic for attracting or attaching the mineral particles to the surface.

According to some embodiments of the present invention, the functional group may take the form of a collector that is either ionic or non-ionic.

According to some embodiments of the present invention, the ion may be anionic or cationic. In other words, the collector may be anionic or cationic. The anion comprises an oxyhydryl, including carboxylic, sulfates and sulfonates, and sulfhydral bond.

According to some embodiments of the present invention, the functional group may have a covalent bond for attracting or attaching the mineral particles to the surface.

According to some embodiments of the present invention, the synthetic beads may be configured with a size depending on the particular application, or depending on the particular size of the mineral particle of interest.

According to some embodiments of the present invention, the synthetic beads may be configured with a size substantially larger than the mineral particles, with one or more mineral particles capable of attaching to a bead. According further to the invention, the beads may also be configured to have a positive buoyancy for applications related to flotation cells. According to a further embodiment of the invention, the bead may be configured to have a neutral or negative buoyancy for selecting and separating the mineral particles.

According to some embodiments of the present invention, the synthetic beads may be configured with a size substantially smaller than the mineral particles, with one or more beads capable of attaching to a mineral particle. According further to the invention, the beads may also be configured to have positive buoyancy for applications related to flotation cells. According to a further embodiment of the invention, the bead may be configured to have neutral or negative buoyancy for selecting and separating the mineral particles.

According to some embodiments of the present invention, the synthetic beads may be configured with a size substantially larger than the mineral particles, with only a portion of the surface of the bead functionalized to be attractive to and attach to one or more mineral particles. According further to the invention, the beads may also be configured to have positive buoyancy for applications related to flotation cells. According to a further embodiment of the invention, the bead may be configured to have neutral or negative buoyancy for selecting and separating the mineral particles.

According to some embodiments of the present invention, the synthetic beads may be configured with a plurality of size distribution, with some sized substantially smaller than the mineral particles, some substantially the same size as the mineral particles, and some substantially larger than the mineral particles.

According to some embodiments of the present invention, the synthetic beads may be configured with a size less than 100 µm for attracting to the mineral particles, e.g., having a substantially similar size, smaller size or larger size, including in applications related to flotation cells. Alternatively, according to some embodiments of the present invention, the synthetic beads may be configured with a size in a range of about 1 mm to 10 mm for attaching to the mineral particles, including in applications related to a tailings pond. Furthermore, according to some embodiments of the present invention, the synthetic beads may also be configured with a size of about 100 µm for attaching to the mineral particles, e.g., having a substantially similar size; or the synthetic beads may be configured with a size in a range of about 50-500 µm for attracting to the mineral particles, e.g., having a substantially similar size, smaller size or larger size; or the synthetic beads may be configured with a size about 200 µm for attracting to the mineral particles, e.g., having a substantially similar size.

According to some embodiments of the present invention, the synthetic beads may be configured with a size in a range of about 100 µm to 10 mm for attracting to the mineral particles.

The Method

According to some embodiments, the present invention may take the form of a method for producing a synthetic bead, comprising steps providing a synthetic bead or bubble having a solid-phase body with a surface, and being configured with a predetermined electric charge so as to respond to a corresponding predetermined electric field; and attaching a plurality of molecules to the surface, the molecules comprising a functional group selected for attracting one or more mineral particles of interest to the molecules.

The method may include one or more of the additional steps or features set forth below:

The method may include configuring some combination of the solid-phase body or the surface from a polymer.

The polymer may be polyethylenimine.

The method may include engineering or configuring the polyethylenimine to be highly charged so as to be used to collect the mineral particles of interest and then manipulated through and by the corresponding predetermined electric field.

The method may include the following:
configuring a flotation tank between a top charged metal plate having a first polarity and a bottom charged metal plate having a second polarity opposite to the first polarity;
configuring the flotation tank to be filled with and contain a solution or slurry having synthetic beads in the form of charged polymers having the first polarity, embedded collectors, and a mineral slurry having the mineral particles of interest; and
configuring the top charged metal plate and the bottom charged metal plate to generate the corresponding predetermined electric field in the mineral slurry in order to manipulate the charged polymers.

The method may include configuring the top charged metal plate and the bottom charged metal plate to cause the charged polymers, along with the one or more mineral particles of interest that may be attached thereto, to migrate through the mineral slurry to the top charged metal plate, based at least partly on the predetermined electric field.

The method may include comprises
configuring the top metal plate with a negative charge;
configuring, arranging or placing the top metal plate over the flotation tank;
configuring the bottom charged metal plate with a positive charge;
configuring, arranging or locating the bottom charged metal plate under the flotation tank; and
configuring the charged polymers with a corresponding positive charge.

Synthetic Beads/Bubbles Functionalized with Polymer-Based Materials

According to some embodiments, the present invention may take the form of apparatus for use in, or forming part of, a separation process to be implemented in separation processor technology, where the apparatus features synthetic bubbles or beads configured with a polymer or polymer-based material functionalized to attach to a valuable material in a mixture so as to form enriched synthetic bubbles or beads having the valuable material attached thereto, and also configured to be separated from the mixture based at least partly on a difference in a physical property between the enriched synthetic bubbles or beads having the valuable material attached thereto and the mixture.

The separation process may be implemented in separation processor technology which combines the synthetic bubbles or beads and the mixture, and which provides the enriched synthetic bubbles or beads having the valuable material attached thereto that are separated from the mixture based at least partly on the difference in the physical property between the enriched synthetic bubbles or beads having the valuable material attached thereto and the mixture.

Size-Based Separation

The separation process may be implemented using sized-based separation, where the synthetic bubbles or beads may be configured to be separated from the mixture based at least partly on the difference between the size of the enriched synthetic bubbles or beads having the valuable material attached thereto in relation to the size of unwanted material in the mixture.

According to some embodiments of the present invention, the synthetic bubbles or beads may be configured either so that the size of the synthetic bubbles or beads is greater than a maximum ground ore particle size in the mixture, or so that the size of the synthetic bubbles or beads is less than a minimum ground ore particle size in the mixture.

According to some embodiments of the present invention, the synthetic bubbles or beads may be configured as solid polymer bubbles or beads.

According to some embodiments of the present invention, the synthetic bubbles or beads may be configured with a core material of sand, silica or other suitable material and also configured with a polymer encapsulation.

Weight-Based Separation

The separation process may be implemented using weight-based separation, where the synthetic bubbles or beads are configured to be separated from the mixture based at least partly on the difference between the weight of the enriched synthetic bubbles or beads having the valuable material attached thereto in relation to the weight of unwanted material in the mixture.

According to some embodiments of the present invention, the synthetic bubbles or beads may be configured so that the weight of the synthetic bubbles or beads is greater than a maximum ground ore particle weight in the mixture, or so that the weight of the synthetic bubbles or beads is less than a minimum ground ore particle weight in the mixture.

According to some embodiments of the present invention, the synthetic bubbles or beads may be configured as solid polymer bubbles or beads.

According to some embodiments of the present invention, the synthetic bubbles or beads may be configured with a core material of magnetite, air or other suitable material and also configured with a polymer encapsulation.

Magnetic-Based Separation

The separation process may be implemented using magnetic-based separation, where the synthetic bubbles or beads may be configured to be separated from the mixture based at least partly on the difference between the para-, ferri-, ferro-magnetism of the enriched synthetic bubbles or beads having the valuable material attached thereto in relation to the para-, ferri, ferro-magnetism of unwanted material in the mixture.

According to some embodiments of the present invention, the synthetic bubbles or beads may be configured so that the para-, ferri-, ferro-magnetism of the synthetic bubbles or beads is greater than the para-, ferri-, ferro-magnetism of the unwanted ground ore particle in the mixture.

According to some embodiments of the present invention, the synthetic bubbles or beads may be configured with a ferro-magnetic or ferri-magnetic core that attract and attach to paramagnetic surfaces and also configured with a polymer encapsulation.

Density-Based Separation

The separation process may be implemented using density-based separation, where the synthetic bubbles or beads may be configured to be separated from the mixture based at least partly on the difference between the density of the enriched synthetic bubbles or beads having the valuable material attached thereto and the density of the mixture, consistent with that disclosed in the aforementioned patent application serial no. PCT/US12/39528 (WFVA/CiDRA file no. 712-2.356-1/CCS-0052), which is hereby incorporated by reference in its entirety. Alternatively, according some embodiments of the present invention, the synthetic bubbles or beads may be configured to be hollow and have substantially the same density as the mixture so as to be at least partly suspended and separated using other techniques, including by magnetism, or including by heating so as to change the density of the synthetic bubbles or beads relative to the mixture.

BRIEF DESCRIPTION OF THE DRAWING

Referring now to the drawing, which are not drawn to scale, the foregoing and other features and advantages of the present invention will be more fully understood from the following detailed description of illustrative embodiments, taken in conjunction with the accompanying drawing in which like elements are numbered alike:

FIGS. 1-6 show respectively sized-based beads and bubbles, weight-based polymer beads and bubbles, and magnetic-based beads and bubbles according to some embodiments of the present invention, including FIGS. 1 and 2 that respectively show a size-based solid polymer bead and bubble and a size-based bead and bubble having a core material and a polymer encapsulation;

FIGS. 3 and 4 that respectively show a weight-based solid polymer bead and bubble and a weight-based bead and bubble having a core material and a polymer encapsulation; and FIGS. 5 and 6 that respectively show a magnetic-based bead and bubble having a ferro-, or ferri-, or para-magnetic core and a polymer encapsulation.

FIG. 12 is a diagram of a flotation cell or column that may be used in place of the flotation cell or column that forms part of the flotation system, process or apparatus shown in FIG. 11 according to some embodiments of the present invention.

DETAILED DESCRIPTION OF THE INVENTION

Figure 16A:
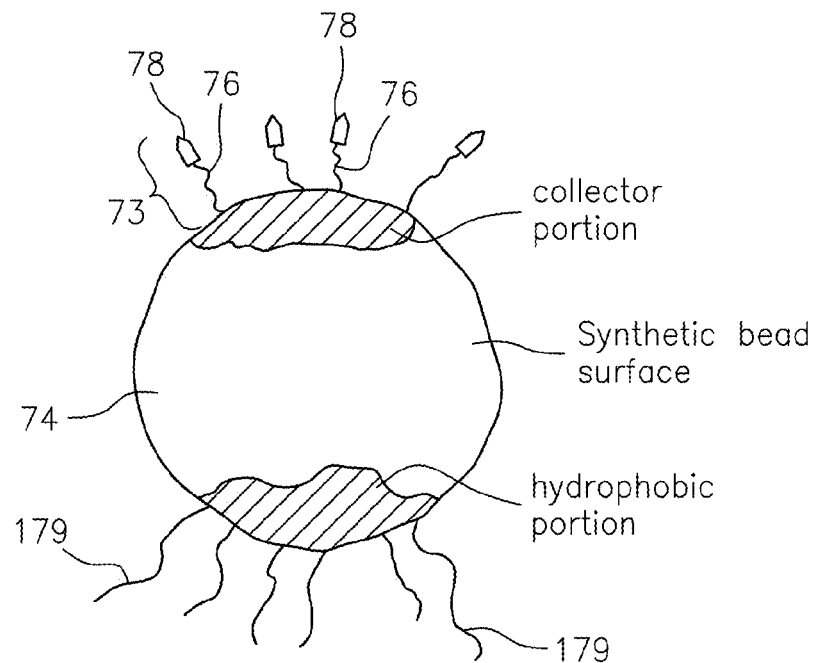
FIGS. 16a and 16b illustrate some embodiments of the present invention wherein the synthetic bead or bubble have one portion functionalized to have collector molecules and another portion functionalized to be hydrophobic.
Figure 16B:
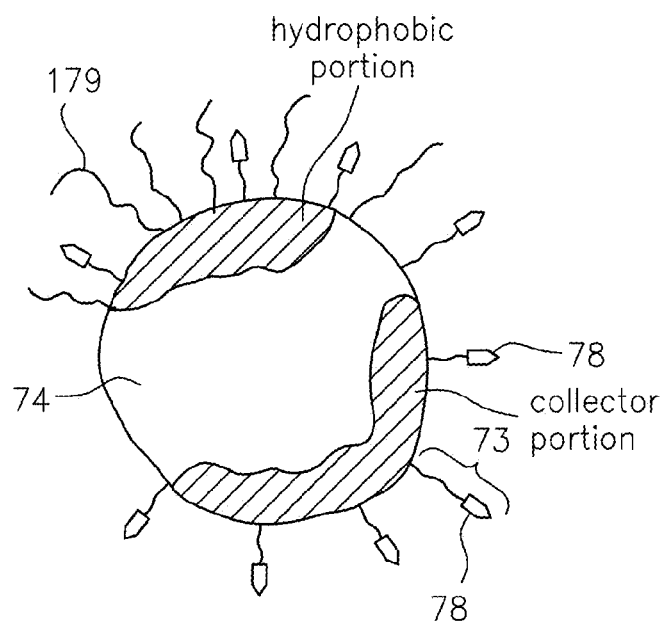
Figure 17:
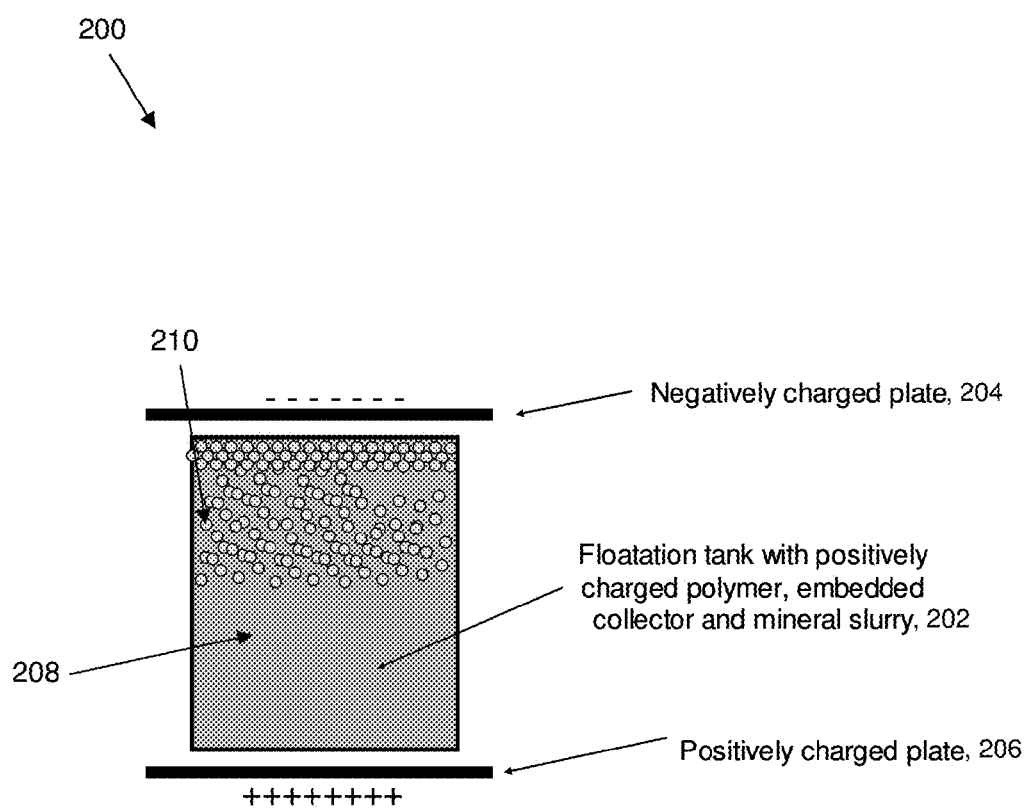
FIG. 17 is a diagram of a flotation tank configured between a top negatively charged metal plate and a bottom positively charged metal plate and filled with a mineral solution or slurry having positively charged polymers with embedded collectors, according to some embodiments of the present invention.

FIG. 17 shows a new embodiment of the present invention, while the remaining FIGS. 1 to 16b show the subject matter of the aforementioned PCT application no. PCT/US12/39576.

FIG. 17

According to some embodiments of the present invention, and by way of example, FIG. 17 shows apparatus 200 in the form of a flotation tank 202 configured between a top negatively charged metal plate 204 and a bottom positively charged metal plate 206 and filled with a mineral solution or slurry 208 having positively charged polymers 210 with embedded collectors or collector molecules (e.g., see FIGS. 13b, 15a, 16a and 16b). The mineral solution or slurry 208 includes one or more mineral particles of interest. The top negatively charged metal plate 204 and the bottom charged metal plate 206 may be configured to generate a predetermined electric field in the mineral solution or slurry in order to manipulate the positively charged polymers 210. In operation, the top charged metal plate 204 and the bottom charged metal plate 206 may be configured to cause the charged polymers 210, along with some of the one or more mineral particles of interest that may be attached thereto, to migrate through the mineral solution or slurry 208 to the top charged metal plate 204, based at least partly on the predetermined electric field.

A person skilled in the art without undue experimentation would be able to configured the top metal plate 204 and the bottom metal plate 206 so as to create the predetermined electric field, and configure the charged polymers 210 with a suitable charge in order to manipulate the positively charged polymers 210 in a manner consistent with the present invention. In effect, the scope of the invention is not intended to be limited to any particular type, kind or magnitude of the negative charge, the positive charge or the predetermined electric field caused by the respective charges.

The top metal plate 204 configured with the negative charge may be configured, arranged or placed over the flotation tank 202, including being directly mounted or not being directly mounted on a top portion of the flotation tank 20, consistent with that shown in FIG. 17. The scope of the invention is not intended to be limited to how the top metal plate 204 is configured, arranged or placed on or over the flotation tank 202.

The bottom charged metal plate 206 configured with the positive charge may be configured, arranged or located under the flotation tank 202, including being directly mounted or not being directly mounted on a bottom portion of the flotation tank 20, consistent with that shown in FIG. 17. The scope of the invention is not intended to be limited to how the bottom metal plate 206 is configured, arranged or located under the flotation tank 202.

The charged polymers 210 may be configured with a corresponding positive charge that is of an opposite polarity to the top metal plate 204, so as to be attracted to the top metal plate 204 and repelled by the bottom metal plate 206.

The scope of the invention is not intended to be limited to the polarity of the charge of the top metal plate 204, the bottom metal plate 206 or the charged polymer 210. For example, the scope of the invention is intended to include, and embodiments of the present invention are envisioned, in which the top metal plate 204 is configured with a positive charge, the bottom metal plate 206 is configured with a negative charge, and the charged polymers 210 are configured with a corresponding negative charge, so as to be attracted to the top metal plate 204 and repelled by the bottom metal plate 206.

According to some embodiment, the apparatus may take the form of a synthetic bead, consistent with that shown in FIGS. 1-17 herein. For example, consistent with that disclosed herein, the synthetic bead, e.g., such as element 10 (see FIG. 1) or 70 (see FIGS. 7a and 7b), may be configured with, or configured as, a solid-phase body with a surface like element 74 (see FIGS. 7a and 7b), and also configured with the predetermined electric charge so as to respond to the corresponding predetermined electric field between the plates 204 and 206; and a plurality of molecules like element 76 (see FIGS. 7a and 7b) attached to at least part of the surface 74, the molecules 76 comprising a functional group like element 78 (see FIGS. 7a and 7b) selected for attracting and attaching one or more mineral particles 72 of interest to the molecules 76.

By way of example, the solid phase body may take the form of, e.g., a solid material made from a polymer like that shown in FIG. 1. Alternatively, and further by way of example, the solid phase body may also takes the form of, e.g., a combination of a core material and a polymer encapsulating material, e.g., including where the core material take the form of a core element like element 21 (FIG. 2), or 41 (FIG. 4), 51 (FIG. 5), or 61 (FIG. 6) made from one material like sand, silica, or some other material like a polymer consistent with that disclosed herein, and where the core element is encapsulated by the polymer encapsulating material made from another material like encapsulating element 23 (FIG. 2), or 43 (FIG. 4), 53 (FIG. 5), or 63 (FIG. 6). In such a combination, the scope of the invention is intended to include the core material and/or the polymer encapsulating material being electrically charged.

In effect, according to some embodiments of the present invention, some combination of the solid-phase body and/or the surface 74 (e.g., see FIGS. 7a, 7b) may be configured from a polymer or polymer material and/or electrically charged. By way of example, the polymer or polymer material may be, or take the form of, polyethylenimine, including one engineered and/or configured to be highly charged so as to be used to collect the mineral particles of interest and then manipulated through and by the corresponding predetermined electric field. The scope of the invention is intended to include other types or kinds of polymers or polymer materials either now known or later developed in the future, consistent with that set forth herein. The scope of the invention is intended to include, and embodiments are envisioned, where which the solid-phase body and/or the surface 74 is made or manufactured from a charged material, as well as where the solid-phase body and/or the surface 74 is made or manufactured from an uncharged material, e.g., an uncharged polymer or polymer material, and subsequently charged after being made or manufactured from the uncharged material.

Flushing Using Periodic Reverse Polarity

During the separation process, it is understood that the charged particles or polymers 210 would migrate to the top of the flotation tank 202 and be swept off in a process flow, and further processed. However, over time it may be possible for some charged particles or polymers to attach to and accumulate on the top collector plate 204, which may impeded the electric field between the plates 204, 206 and degrade the overall separation process over time. In effect, if too many of these charged particles or polymers 210 were allowed to accumulate, it could reduce the effectiveness of the overall separation process over time.

According to some embodiment of the present invention, the polarity of the plates 204, 206 could be reversed periodically to force off any attached charged particles or polymers 210 that did come in contact with the top collector plate 204 and were held there, causing them to be released and to migrate in the direction of the other plate. In effect, the polarity of the plates 204, 206 could be reversed periodically for just enough time to "clean off" the plates 204, 206 and let the process flow sweep away these released charged particles or polymers from the top collector plate 204. This technique would maintain the strength and consistency of the electric field, improve the efficiency of the system, and improve the overall separation process over time.

By way of example, and according to some embodiments, the apparatus 200 may be configured with a signal processor or controller and/or timer configured to provide signaling to reverse periodically the polarity of the plates 204, 206 over time. The signal processor or controller and/or the timer may be configured to implement associated timer functionality in order to periodically reverse the polarity. Signal processors or controllers, timers and/or associated timer functionality are known in the art, and the scope of the invention is not intended to be limited to any particular type or kind thereof either now known or later developed in the future. The scope of the invention is also not intended to be limited to any particular period or time for implementing the reversal of polarity of the plates 204, 206, or to any particular time in which the plates 204, 206 have the reverse polarity. A person skilled in the art without undue experimentation would be able to configure such a signal processor or controller and/or such a timer in order implement such associated timer functionality, based at least partly on that disclosed herein. The scope of the invention is also intended to include using fixed periods of time for implementing the reversal of polarity of the plates 204, 206, or using fixed periods of time in which the plates 204, 206 have the reverse polarity, as well as variable periods of time that may be adjusted by an operator of any such separation processing equipment.

FIGS. 1 to 16b

The remaining part of the application describes the subject matter of FIGS. 1 to 16b of the aforementioned PCT application no. PCT/US12/39576 (712-2.382), which may be used in one or more combinations with the present invention set forth above in relation to FIG. 17, as follows:

FIGS. 1-6 show the present invention in the form of apparatus or material for use in, or forming part of, a separation process to be implemented in separation processor technology, the apparatus featuring synthetic bubbles or beads indicated by arrows 10 (FIG. 1), 20 (FIG. 2), 30 (FIG. 3), 40 (FIG. 4), 50 (FIG. 5), 60 (FIG. 6), configured with a polymer or polymer-based material 11 (FIG. 1), 21 (FIG. 2), 31 (FIG. 3), 41 (FIG. 4), 51 (FIG. 5), 61 (FIG. 6) functionalized to attach to a valuable material 12 (FIG. 1), 22 (FIG. 2), 32 (FIG. 3), 42 (FIG. 4), 52 (FIG. 5), 62 (FIG. 6) in a mixture so as to form an enriched synthetic bubble or bead generally indicated as 15 (FIG. 1), 25 (FIG. 2), 35 (FIG. 3), 45 (FIG. 3), 55 (FIG. 5), 65 (FIG. 6) having the valuable material 12 (FIG. 1), 22 (FIG. 2), 32 (FIG. 3), 42 (FIG. 4), 52 (FIG. 5), 62 (FIG. 6) attached thereto, consistent with that disclosed herein, and also configured to be separated from the mixture based at least partly on a difference in a physical property between the enriched synthetic bubbles or beads 15 (FIG. 1), 25 (FIG. 2), 35 (FIG. 3), 45 (FIG. 3), 55 (FIG. 5), 65 (FIG. 6) having the valuable material 12 (FIG. 1), 22 (FIG. 2), 32 (FIG. 3), 42 (FIG. 4), 52 (FIG. 5), 62 (FIG. 6) attached thereto. The mixture can be a pulp slurry, for example.

In FIG. 1, the synthetic bubble or bead 10 is a size-based solid polymer bead and bubble 11 functionalized to attach to the valuable material 12 of interest in the mixture and to be separated from the mixture based on size. In FIG. 2, the synthetic bubble or bead 20 is a size-based bead and bubble 20 having a core material 21 and a polymer encapsulation 23 functionalized to attach to the valuable material 22 of interest in the mixture and to be separated from the mixture based on size. By way of example, the core material 21 may include materials such as sand, silica or other suitable material either now known or later developed in the future.

Polymers or polymer-based materials that may be functionalized to attach to such a valuable material, such as valuable material 12 (FIG. 1), 22 (FIG. 2), 32 (FIG. 3), 42 (FIG. 4), 52 (FIG. 5), 62 (FIG. 6), of interest, such as copper, gold, nickel, lead or other mineral are known in the art, and the scope of the invention is not intended to be limited to any particular type or kind thereof. Embodiments are envisioned using polymers or polymer-based materials now known and later developed in the future. It should be noted that the bubbles or beads are referred herein as synthetic bubbles or beads. The term "polymer" in this disclosure may be understood to mean a large molecule made of many units of the same or similar structure linked together. The unit can be a monomer or an oligomer which forms the basis of, for example, polyamides (nylon), polyesters, polyurethanes, phenol-formaldehyde, urea-formaldehyde, amide, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin and polydimethylsiloxane. The list is not necessarily exhaustive. Thus, the synthetic material can be hard or rigid like plastic or soft and flexible like an elastomer. While the physical properties of the synthetic beads can vary, the surface of the synthetic beads is chemically functionalized to provide one or more functional groups to attract or attach to mineral particles. Alternatively, the entire synthetic material may be functionalized, such that if the surface of the material is worn, abraded or otherwise consumed, new functionalized material is exposed to attract and attach to the mineral particles. (By way of example, the term "functional group" may be understood to be a group of atoms responsible for the characteristic reactions of a particular compound, including which define the structure of a family of compounds and determine its properties.) The terms "valuable material" and "mineral particle" are used herein interchangeably.

According to the present invention, the synthetic bubbles or beads 10 or 20 in FIGS. 1 and 2 may be configured to be separated from the mixture based at least partly on the difference between the size of the enriched synthetic bubbles or beads having the valuable material 12, 22 attached thereto in relation to the size of unwanted material in the mixture. For example, the synthetic bubble or bead 10 or 20 may be configured either so that the size of the synthetic bubbles or beads 10 or 20 is greater than a maximum ground ore particle size in the mixture, or so that the size of the synthetic bubbles or beads 10 or 20 is less than a minimum ground ore particle size in the mixture. When the particle size is large, a small bubble or bead may not be able to lift the valuable material upward. When the particle size is small, the flow around a large bubble or bead may cause the valuable material to move away from the bubble or bead. Thus, it may be more efficient to use smaller bubbles or beads to collect the valuable material in a small ground.

In FIG. 3, the synthetic bubble or bead 30 is a weight-based solid polymer bead and bubble 31 functionalized to attach to the valuable material 32 of interest in the mixture and to be separated from the mixture based on weight. In FIG. 4, the synthetic bubbles or beads 40 is a weight-based bead and bubble 40 having a core material 41 and a polymer encapsulation 43 functionalized to attach to the valuable material 42 of interest in the mixture and to be separated from the mixture based on weight. The core material 41 may be made of materials such as magnetite, air or other suitable material and also configured with a polymer encapsulation.

According to the present invention, the synthetic bubbles or beads 30, 40 may be configured to be separated from the mixture based at least partly on the difference between the weight of the enriched synthetic bubbles or beads having the valuable material attached thereto in relation to the weight of unwanted material in the mixture. For example, the synthetic bubbles or beads 30, 40 may be configured so that the weight of the synthetic bubbles or beads is greater than a maximum ground ore particle weight in the mixture, or so that the weight of the synthetic bubbles or beads is less than a minimum ground ore particle weight in the mixture.

Figure 5:
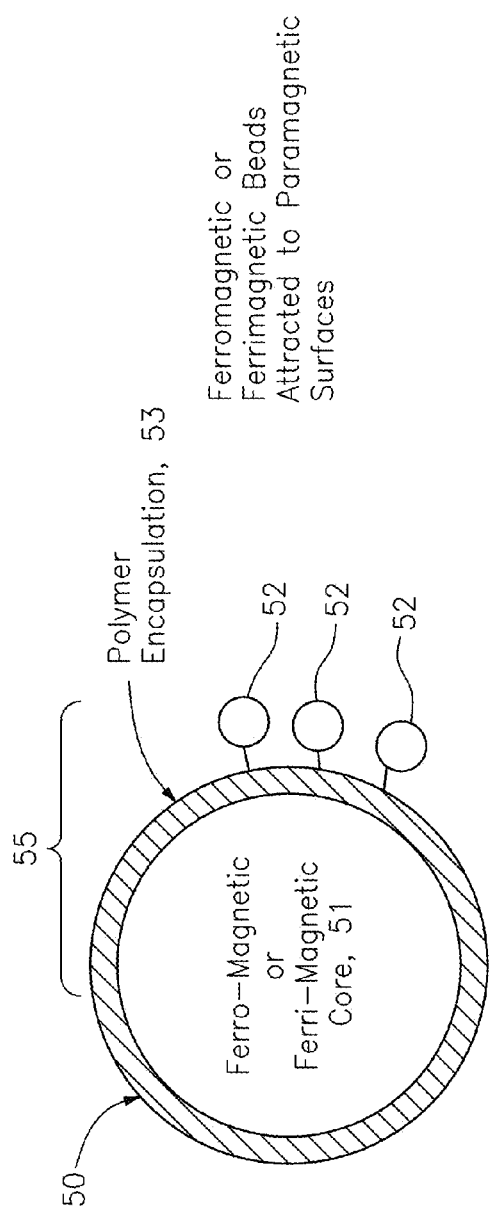
Figure 6:
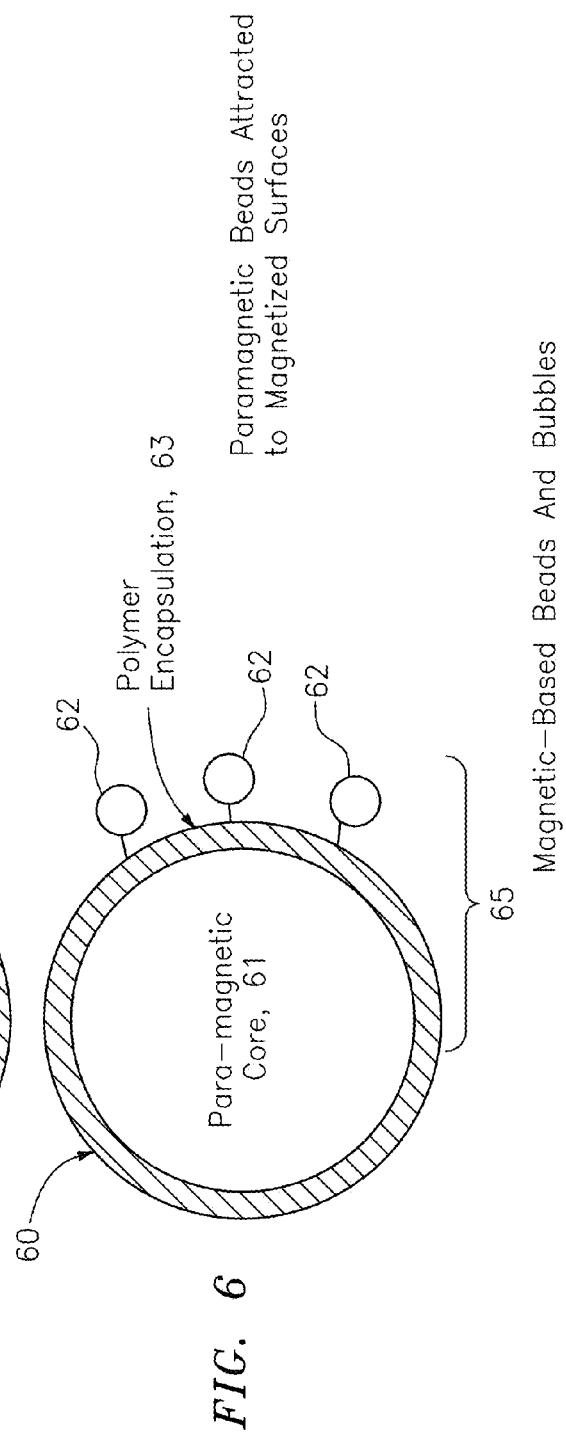

In FIG. 5, the synthetic bead or bubble 50 is shown as a magnetic-based bead and bubble having a ferro- or ferri-magnetic core 51 and a polymer encapsulation 53, such that the ferro-magnetic or ferri-magnetic core 51 attracts to paramagnetic surfaces. In FIG. 6, the synthetic bead or bubble is shown as a magnetic-based bead and bubble having a para-magnetic core 61 and a polymer encapsulation 63, such that the para-magnetic core attracts to magnetized surfaces.

According to the present invention, the synthetic bubbles or beads 50. 60 may be configured to be separated from the mixture based at least partly on the difference between the para-, ferri-, ferro-magnetism of the enriched synthetic bubbles or beads having the valuable material 52, 62 attached thereto in relation to the para-, ferri-, ferro-magnetism of unwanted material in the mixture.

Figure 7B:
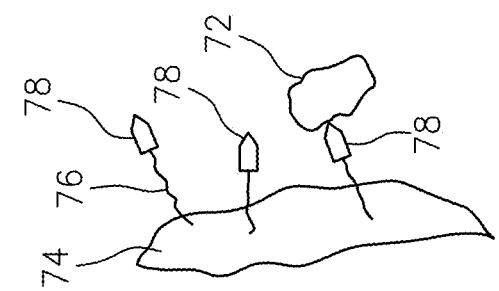
FIG. 7b illustrates an enlarged portion of the synthetic bead showing a molecule or molecular segment for attaching a function group to the surface of the synthetic bead, according to some embodiments of the present invention.
Figure 7A:
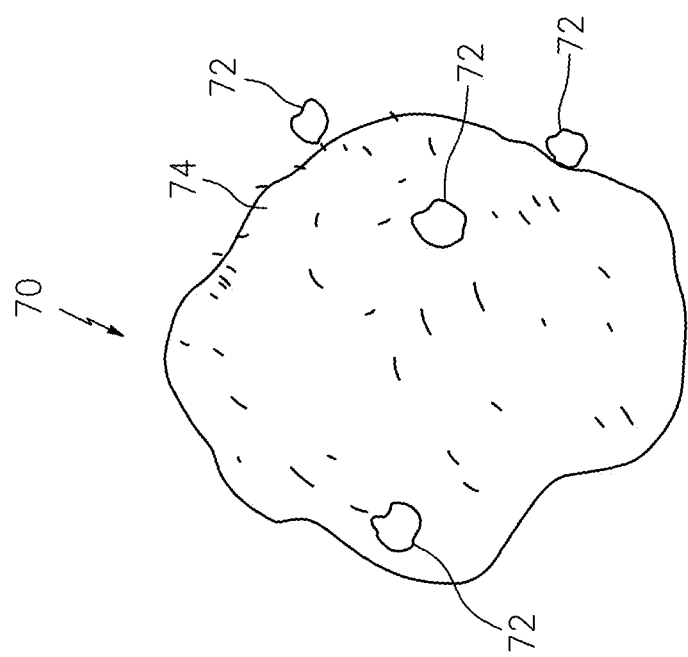
FIG. 7a shows a generalized synthetic bead which can be a size-based bead or bubble, weight-based polymer bead and bubble, and magnetic-based bead and bubble, according to some embodiments of the present invention.

For aiding a person of ordinary skill in the art in understanding various embodiments of the present invention, FIG. 7a shows a generalized synthetic bead and FIG. 7b shows an enlarged portion of the surface. The synthetic bead can be a size-based bead or bubble, weight-based polymer bead and bubble, and magnetic-based bead and bubble as described in conjunction with FIGS. 1 to 6. As shown in FIGS. 7a and 7b, the synthetic bead 70 has a bead body to provide a bead surface 74. At least the outside part of the bead body is made of a synthetic material, such as polymer, so as to provide a plurality of molecules or molecular segments 76 on the surface 74. The molecule 76 is used to attach a chemical functional group 78 to the surface 74. In general, the molecule 76 can be a hydrocarbon chain, for example, and the functional group 78 can have an anionic bond (or anion) for bonding a mineral, such as copper, to the surface 74. A xanthate, for example, has both the functional group 78 and the molecular segment 76 to be incorporated into the polymer that is used to make the synthetic bead 70. The functional group 78 is also known as a collector that is either ionic or non-ionic. The ion can be anionic or cationic. An anion includes oxyhydryl, such as carboxylic, sulfates and sulfonates, and sulfhydral, such as xanthates and dithiophosphates. Other molecules or compounds that can be used to provide the function group 78 include, but are not limited to, thionocarboamates, thioureas, xanthogens, monothiophosphates, hydroquinones and polyamines.

Similarly, a chelating agent can be incorporated into or onto the polymer as a collector site for attracting a mineral, such as copper. As shown in FIG. 7b, a mineral particle 72 is attached to the functional group 78 on the molecule 76. In general, the mineral particle 72 is much smaller than the synthetic bead 70. Many mineral particles 72 can be attracted to or attached to the surface 74 of a synthetic bead 70. When the mineral particles 72 are very fine, smaller synthetic beads 70 can also be used.

Figure 8A:
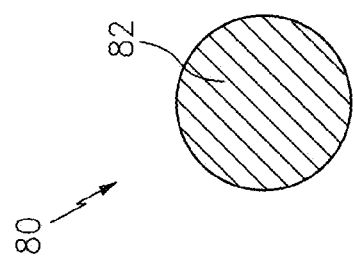
FIG. 8a illustrates a synthetic bead having a body made of a synthetic material, according to some embodiments of the present invention.
Figure 8B:
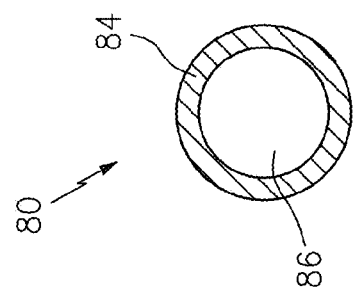
FIG. 8b illustrates a synthetic bead with a synthetic shell, according to some embodiments of the present invention.

In some embodiments of the present invention, a synthetic bead may take the form of a solid-phase body made of a synthetic material, such as polymer. (By way of example, the term "solid-phase body" is understood herein to be a body having a cohesive force of matter that is strong enough to keep the molecules or atoms in the given positions, restraining the thermal mobility.) The polymer can be rigid or elastomeric. An elastomeric polymer can be polyisoprene, polybutadiene or natural rubber, for example. The body has a surface comprising a plurality of molecules with one or more functional groups for attracting or attaching mineral particles to the surface. A polymer having a functional group to attract or collect mineral particles is referred to as a functionalized polymer. In one embodiment, the entire body 82 of the synthetic bead 80 is made of the same functionalized material, as shown in FIG. 8a. In another embodiment, the bead body is a shell, as shown in FIG. 8b. The shell 84 can be formed by way of expansion, such as thermal expansion or pressure reduction.

Figure 8C:
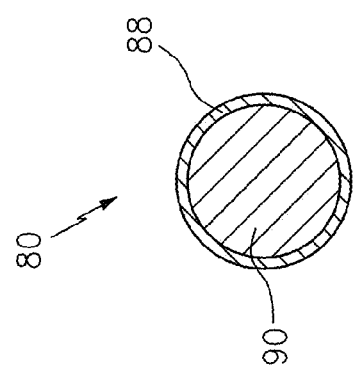
FIG. 8c illustrates a synthetic bead with a synthetic coating, according to some embodiments of the present invention.
Figure 8D:
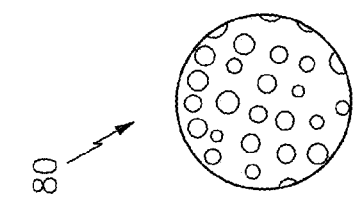
FIG. 8d illustrates a synthetic bead taking the form of a porous block, according to some embodiment of the present invention.

The shell 84 can be formed as a micro-bubble or a balloon. In FIG. 8b, the shell 84, which is made of functionalized material, has an interior part 86. The interior part 86 can be filled with air or gas to aid buoyancy, for example. The interior part 86 can be used to contain a liquid to be released during the mineral separation process. The encapsulated liquid can be a polar liquid or a non-polar liquid, for example. The encapsulated liquid can contain a depressant composition for the enhanced separation of copper, nickel, zinc, lead in sulfide ores in the flotation stage, for example. The shell 84 can be used to encapsulate a powder which can have a magnetic property so as to cause the synthetic bead to be magnetic, for example. The encapsulated liquid or powder may contain monomers, oligomers or short polymer segments for wetting the surface of mineral particles when released from the beads. For example, each of the monomers or oligomers may contain one functional group for attaching to a mineral particle and one charge species for attaching the wetted mineral particle to the synthetic bead. The shell 84 can be used to encapsulate a solid core, such as Styrofoam to aid buoyancy, for example. In yet another embodiment, only the coating of the bead body can be made of functionalized polymer. As shown in FIG. 8c, the synthetic bead can have a core 90 made of ceramic, glass or metal and only the surface of core 90 can have a coating 88 made of functionalized polymer. The core 90 can be a hollow core or a filled core depending on the applications. The core 90 can be a micro-bubble, a sphere or balloon. For example, a filled core made of metal makes the density of the synthetic bead to be higher than the density of the pulp slurry, for example. The core 90 can be made of a magnetic material so that the para-, ferri-, ferro-magnetism of the synthetic bead is greater than the para-, ferri-, ferro-magnetism of the unwanted ground ore particle in the mixture. According to some embodiments, the synthetic bead can be configured with a ferro-magnetic or ferri-magnetic core that attract and attach to paramagnetic surfaces. A core 90 made of glass or ceramic can be used to make the density of the synthetic bead substantially equal to the density of the pulp slurry so that when the synthetic beads are mixed into the pulp slurry for mineral collection, the beads can be in a suspension state.

According to a different embodiment of the present invention, the synthetic bead 80 can be a porous block or take the form of a sponge or foam with multiple segregated gas filled chambers. The combination of air and the synthetic beads 80 can be added to traditional naturally aspirated flotation cell.

Figure 9A:
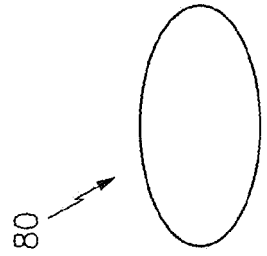
FIG. 9a illustrates a synthetic bead having an elliptical shape, according to some embodiments of the present invention.
Figure 9B:
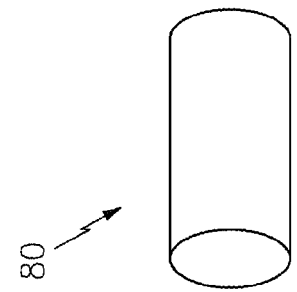
FIG. 9b illustrates a synthetic bead having a cylindrical shape, according to some embodiments of the present invention.
Figure 9C:
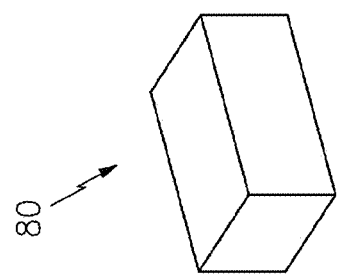
FIG. 9c illustrates a synthetic bead having a shape of a block, according to some embodiments of the present invention.
Figure 9D:
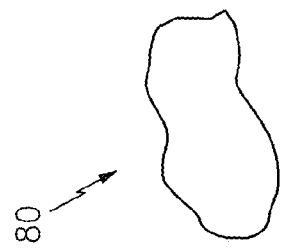
FIG. 9d illustrates a synthetic bead having an irregular shape, according to some embodiments of the present invention.

It should be understood that the use of the term "bead" is not intended to limit the shape of the synthetic bead of the present invention to being spherical, as shown in FIG. 7. In some embodiments of the present invention, the synthetic bead 80 can have an elliptical shape as shown in FIG. 9a. The synthetic bead can have a cylindrical shape as shown in FIG. 9b. The synthetic bead can have a shape of a block as shown in FIG. 9c. Furthermore, the synthetic bead can have an irregular shape, as shown in FIG. 9d. In effect, the scope of the invention is not intended to be limited to any particular type or kind of shape of the synthetic bead 80.

Figure 10C:
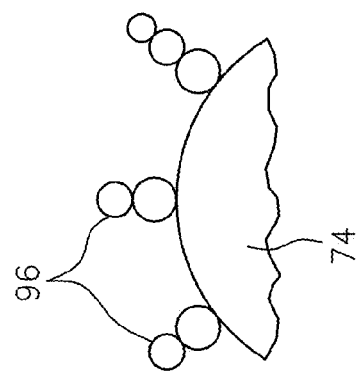
FIG. 10c illustrates the surface of a synthetic bead with stacked beads, according to some embodiments of the present invention.
Figure 10B:
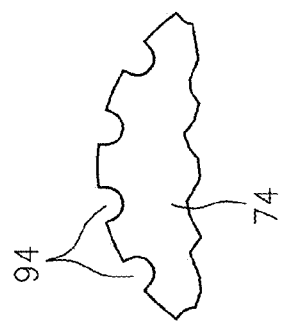
FIG. 10b illustrates the surface of a synthetic bead with dents and/or holes, according to some embodiments of the present invention.
Figure 10D:
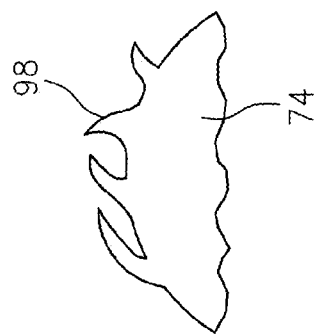
FIG. 10d illustrates the surface of a synthetic bead with hair-like physical structures, according to some embodiments of the present invention.
Figure 10A:
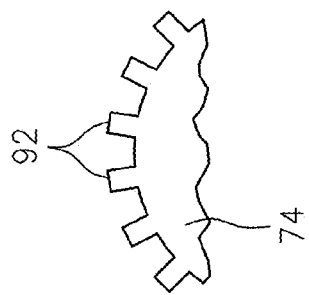
FIG. 10a illustrates the surface of a synthetic bead with grooves and/or rods, according to some embodiments of the present invention.

It should also be understood that the surface of a synthetic bead, according to the present invention, is not limited to an overall smooth surface as shown in FIG. 7a. In some embodiments of the present invention, the surface can be irregular and rough. For example, the surface 74 can have some physical structures 92 like grooves or rods as shown in FIG. 10a. The surface 74 can have some physical structures 94 like holes or dents as shown in FIG. 10b. The surface 74 can have some physical structures 96 formed from stacked beads as shown in FIG. 10c. The surface 74 can have some hair-like physical structures 98 as shown in FIG. 10d. In addition to the functional groups on the synthetic beads that attract mineral particles to the bead surface, the physical structures can help trapping the mineral particles on the bead surface. The surface 74 can be configured to be a honeycomb surface or a sponge-like surface for trapping the mineral particles and/or increasing the contacting surface. In effect, the scope of the invention is not intended to be limited to any particular type or kind of surface of the synthetic bead 80.

It should be noted that the synthetic beads of the present invention can be realized by a different way to achieve the same goal. Namely, it is possible to use a different means to attract the mineral particles to the surface of the synthetic beads. For example, the surface of the polymer beads or shells can be functionalized with a hydrophobic chemical molecule or compound. Alternatively, the surface of beads made of glass, ceramic and metal can be coated with hydrophobic chemical molecules or compounds. Using the coating of glass beads as an example, polysiloxanates can be used to functionalize the glass beads in order to make the synthetic beads. In the pulp slurry, xanthate and hydroxamate collectors can also be added therein for collecting the mineral particles and making the mineral particles hydrophobic. When the synthetic beads are used to collect the mineral particles in the pulp slurry having a pH value around 8-9, it is possible to release the mineral particles on the enriched synthetic beads from the surface of the synthetic beads in an acidic solution, such as a sulfuric acid solution. According to some embodiment, it may also be possible to release the mineral particles carried with the enriched synthetic beads by sonic agitation, such as ultrasonic waves, or simply by washing it with water.

Figure 11:
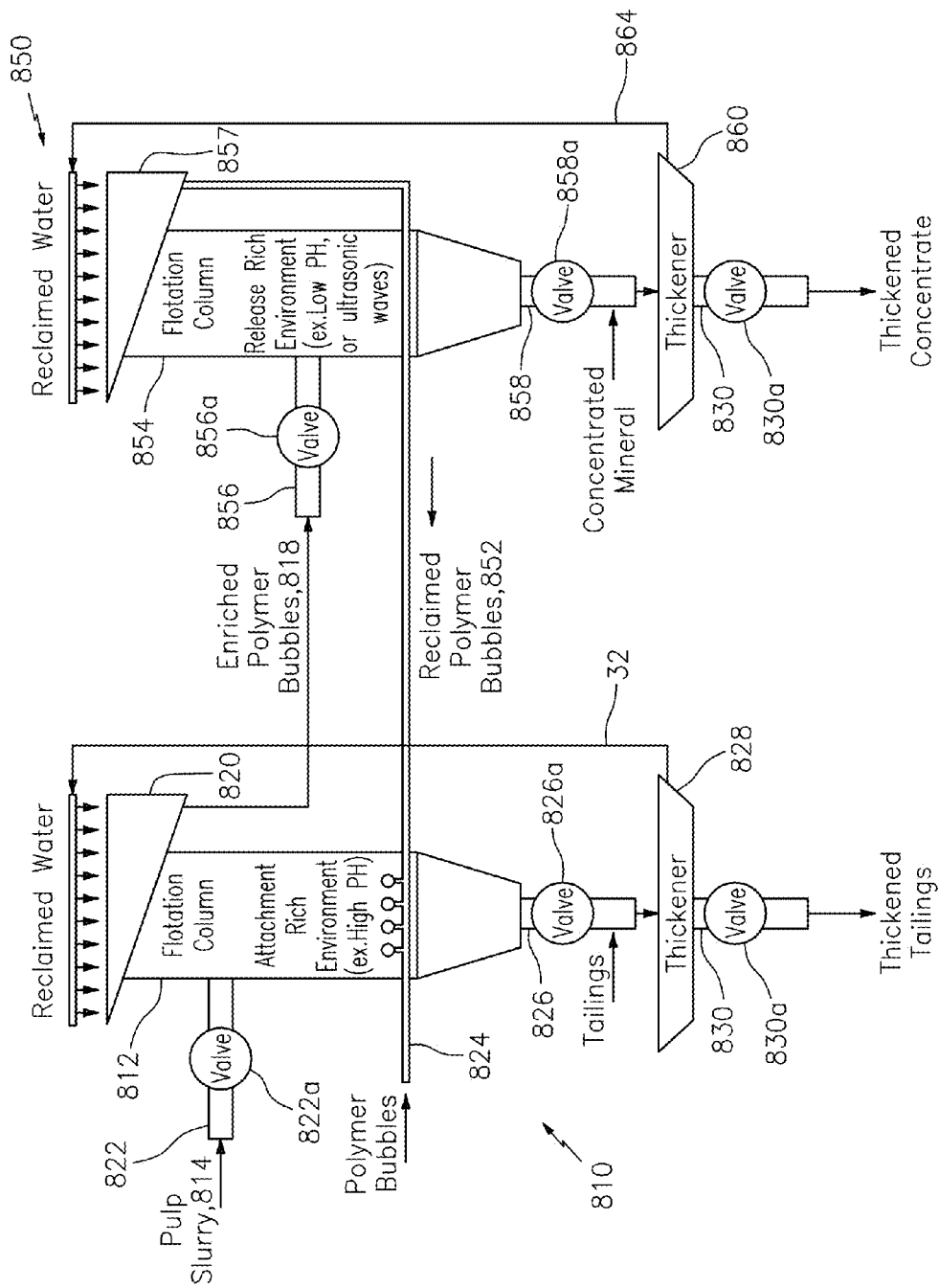
FIG. 11 is a diagram of a flotation system, process or apparatus according to some embodiments of the present invention.

FIGS. 11 and 12: Flotation Apparatus

By way of example, FIG. 11 shows the present invention is the form of apparatus 810, having a flotation cell or column 812 configured to receive a mixture of fluid (e.g. water), valuable material and unwanted material, e.g., a pulp slurry 814; receive synthetic bubbles or beads 70 (FIG. 7, for example) that are constructed to be buoyant when submerged in the pulp slurry or mixture 814 and functionalized to control the chemistry of a process being performed in the flotation cell or column, including to attach to the valuable material in the pulp slurry or mixture 814; and provide enriched synthetic bubble or beads 818 having the valuable material attached thereon. By way of example, the synthetic bubbles or beads 70 may be made from polymer or polymer-based materials, or silica or silica-based materials, or glass or glass-based materials, although the scope of the invention is intended to include other types or kinds of material either now known or later developed in the future. For the purpose of describing one example of the present invention, in FIG. 11 the synthetic bubbles or beads are shown as polymer or polymer-based bubbles labeled 70, and the enriched synthetic bubble or beads 818 are shown as enriched polymer or polymer-based bubbles labeled 818. The flotation cell or column 812 is configured with a top portion or piping 820 to provide the enriched polymer or polymer-based bubbles 818 from the flotation cell or column 812 for further processing consistent with that set forth herein.

The flotation cell or column 812 may be configured with a top part or piping 822, e.g., having a valve 822a, to receive the pulp slurry or mixture 814 and also with a bottom part or piping 824 to receive the polymer or polymer-based bubbles 70. In operation, the buoyancy of the polymer or polymer-based bubbles 70 causes them to float upwardly from the bottom to the top of the flotation cell or column 812 through the pulp slurry or mixture 814 in the flotation cell or column 812 so as to collide with the water, valuable material and unwanted material in the pulp slurry or mixture 814. The functionalization of the polymer or polymer-based bubbles 70 causes them to attach to the valuable material in the pulp slurry or mixture 814. As a result of the collision between the polymer or polymer-based bubbles 70 and the water, valuable material and unwanted material in the pulp slurry or mixture 814, and the attachment of the polymer or polymer-based bubbles 70 and the valuable material in the pulp slurry or mixture 814, the enriched polymer or polymer-based bubbles 70 having the valuable material attached thereto will float to the top of the flotation cell 812 and form part of the froth formed at the top of the flotation cell 812. The flotation cell 812 may include a top part or piping 820 configured to provide the enriched polymer or polymer-based bubbles 818 having the valuable material attached thereto, which may be further processed consistent with that set forth herein. In effect, the enriched polymer or polymer-based bubbles 818 may be taken off the top of the flotation cell 812 or may be drained off by the top part or piping 820.

The flotation cell or column 812 may be configured to contain an attachment rich environment, including where the attachment rich environment has a high pH, so as to encourage the flotation recovery process therein. The flotation recovery process may include the recovery of ore particles in mining, including copper. The scope of the invention is not intended to be limited to any particular type or kind of flotation recovery process either now known or later developed in the future. The scope of the invention is also not intended to be limited to any particular type or kind of mineral of interest that may form part of the flotation recovery process either now known or later developed in the future.

According to some embodiments of the present invention, the polymer or polymer-based bubbles 70 may be configured with a surface area flux by controlling some combination of the size of the polymer or polymer-based bubbles 70 and/or the injection rate that the pulp slurry or mixture 814 is received in the flotation cell or column 812. The polymer or polymer-based bubbles 70 may also be configured with a low density so as to behave like air bubbles. The polymer or polymer-based bubbles 70 may also be configured with a controlled size distribution that may be customized to maximize recovery of different feed matrixes to flotation as valuable material quality changes, including as the quality of the ore changes.

According to some embodiments of the present invention, the flotation cell or column 812 may be configured to receive the polymer or polymer-based bubbles 70 together with air, where the air is used to create a desired froth layer in the mixture in the flotation cell or column 812 in order to achieve a desired grade of valuable material. The polymer or polymer-based bubbles 70 may be configured to lift the valuable material to the surface of the mixture in the flotation cell or column.

The Thickener 828

The apparatus 10 may also include piping 826 having a valve 826a for providing tailings to a thickener 828 configured to receive the tailings from the flotation cell or column 812. The thickener 828 includes piping 830 having a valve 830a to provide thickened tailings. The thickener 828 also includes suitable piping 832 for providing reclaimed water back to the flotation cell or column 812 for reuse in the process. Thickeners like element 828 are known in the art, and the scope of the invention is not intended to be limited to any particular type or kind either now known or later developed in the future.

The Bead Recovery Process or Processor 850

According to some embodiments of the present invention, the apparatus 810 may further comprises a bead recovery process or processor generally indicated as 850 configured to receive the enriched polymer or polymer-based bubbles 818 and provide reclaimed polymer or polymer-based bubbles 852 without the valuable material attached thereon so as to enable the reuse of the polymer or polymer-based bubbles 852 in a closed loop process. By way of example, the bead recovery process or processor 850 may take the form of a washing station whereby the valuable material is mechanically, chemically, or electro-statically removed from the polymer or polymer-based bubbles 818.

The bead recovery process or processor 850 may include a second flotation cell or column 854 having piping 856 with a valve 856a configured to receive the enriched polymer bubbles or beads 818; and substantially release the valuable material from the polymer bubbles or beads 818, and also having a top part or piping 857 configured to provide the reclaimed polymer bubbles or beads 852, substantially without the valuable material attached thereon The second flotation cell or column 854 may be configured to contain a release rich environment, including where the release rich environment has a low pH, or including where the release rich environment results from ultrasonic waves pulsed into the second flotation cell or column 854.

The bead recovery process or processor 850 may also include piping 858 having a valve 856a for providing concentrated minerals to a thickener 860 configured to receive the concentrated minerals from the flotation cell or column 854. The thickener 860 includes piping 862 having a valve 862*a* to provide thickened concentrate. The thickener 860 also includes suitable piping 864 for providing reclaimed water back to the second flotation cell or column 854 for reuse in the process. Thickeners like element 860 are known in the art, and the scope of the invention is not intended to be limited to any particular type or kind either now known or later developed in the future.

Embodiments are also envisioned in which the enriched synthetic beads or bubbles are placed in a chemical solution so the valuable material is dissolved off, or are sent to a smelter where the valuable material is burned off, including where the synthetic beads or bubbles are reused afterwards.

The Collision Technique

FIG. 12 shows alternative apparatus generally indicated as 900 in the form of an alternative flotation cell 901 that is based at least partly on a collision technique between the mixture and the synthetic bubbles or beads, according to some embodiments of the present invention. The mixture 902, e.g. the pulp slurry, may be received in a top part or piping 904, and the synthetic bubbles or beads 906 may be received in a bottom part or piping 908. The flotation cell 901 may be configured to include a first device 910 for receiving the mixture 902, and also may be configured to include a second device 912 for receiving the polymer-based materials. The first device 910 and the second device 912 are configured to face towards one another so as to provide the mixture 902 and the synthetic bubbles or beads 906, e.g., polymer or polymer-based materials, using the collision technique. In FIG. 12, the arrows 910*a* represent the mixture being sprayed, and the arrows 912*a* represent the synthetic bubbles or beads 906 being sprayed towards one another in the flotation cell 901.

In operation, the collision technique causes vortices and collisions using enough energy to increase the probability of touching of the polymer or polymer-based materials 906 and the valuable material in the mixture 902, but not too much energy to destroy bonds that form between the polymer or polymer-based materials 906 and the valuable material in the mixture 902. Pumps, not shown, may be used to provide the mixture 902 and the synthetic bubbles or beads 906 are the appropriate pressure in order to implement the collision technique.

By way of example, the first device 910 and the second device 912 may take the form of shower-head like devices having a perforated nozzle with a multiplicity of holes for spraying the mixture and the synthetic bubbles or beads towards one another. Shower-head like devices are known in the art, and the scope of the invention is not intended to be limited to any particular type or kind thereof either now known or later developed in the future. Moreover, based on that disclosed in the instant patent application, a person skilled in the art without undue experimentation would be able to determine the number and size of the holes for spraying the mixture 902 and the synthetic bubbles or beads 906 towards one another, as well as the appropriate pumping pressure in order to provide enough energy to increase the probability of touching of the polymer or polymer-based materials 906 and the valuable material in the mixture 902, but not too much energy to destroy bonds that form between the polymer or polymer-based materials 906 and the valuable material in the mixture 902.

As a result of the collision between the synthetic bubbles or beads 906 and the mixture, enriched synthetic bubbles or beads having the valuable material attached thereto will float to the top and form part of the froth in the flotation cell 901. The flotation cell 901 may include a top part or piping 914 configured to provide enriched synthetic bubbles or beads 916, e.g., enriched polymer bubbles as shown, having the valuable material attached thereto, which may be further processed consistent with that set forth herein.

The alternative apparatus 900 may be used in place of the flotation columns or cells, and inserted into the apparatus or system shown in FIG. 11, and may prove to be more efficient than using the flotation columns or cells.

Figure 13B:
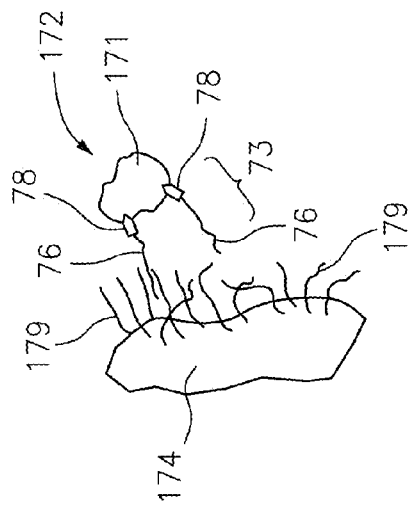
FIG. 13b illustrates an enlarged portion of the hydrophobic synthetic bead showing a wetted mineral particle attaching the hydrophobic surface of the synthetic bead, according to some embodiments of the present invention.
Figure 13C:
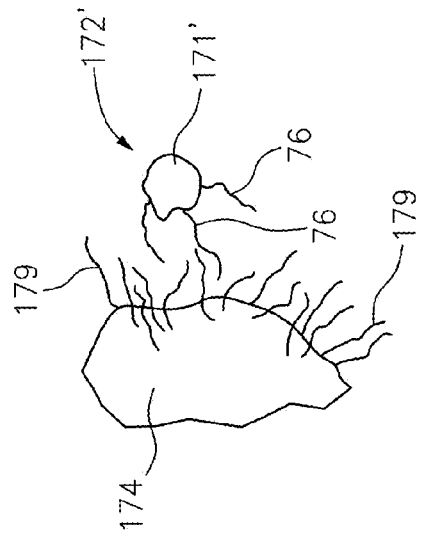
FIG. 13c illustrates an enlarged portion of the hydrophobic synthetic bead showing a hydrophobic non-mineral particle attaching the hydrophobic surface of the synthetic bead, according to some embodiments of the present invention.
Figure 13A:
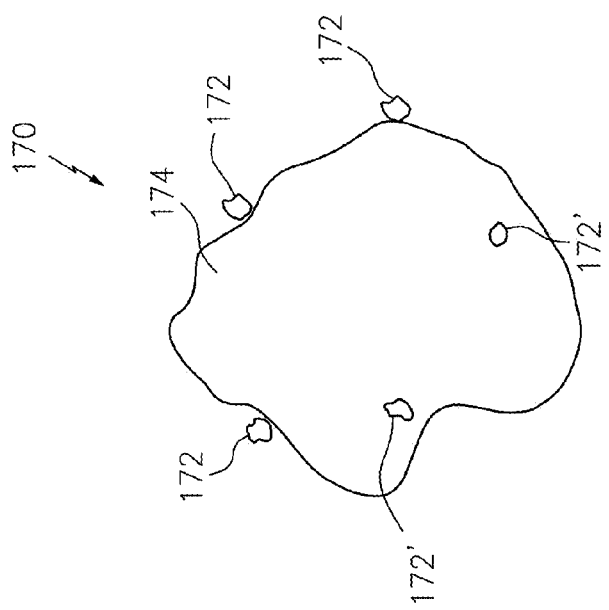
FIG. 13a shows a generalized synthetic bead functionalized to be hydrophobic, wherein the bead can be a size-based bead or bubble, weight-based polymer bead and bubble, and magnetic-based bead and bubble, according to some embodiments of the present invention.

It should be understood that the sized-based bead or bubble, weight-based bead or bubble, magnetic-based bead or bubble as described in conjunction with FIGS. 1 to 6 can be functionalized to be hydrophobic so as to attract mineral particles. FIG. 13*a* shows a generalized hydrophobic synthetic bead, FIG. 13*b* shows an enlarged portion of the bead surface and a mineral particle, and FIG. 13*b* shows an enlarged portion of the bead surface and a non-mineral particle. As shown in FIG. 13*a* the hydrophobic synthetic bead 170 has a polymer surface 174 and a plurality of particles 172, 172' attached to the polymer surface 174. FIG. 13*b* shows an enlarged portion of the polymer surface 174 on which a plurality of molecules 179 rendering the polymer surface 174 hydrophobic. A mineral particle 171 in the slurry, after combined with one or more collector molecules 73, becomes a wetted mineral particle 172. The collector molecule 73 has a functional group 78 attached to the mineral particle 171 and a hydrophobic end or molecular segment 76. The hydrophobic end or molecular segment 76 is attracted to the hydrophobic molecules 179 on the polymer surface 174. FIG. 13*c* shows an enlarged portion of the polymer surface 174 with a plurality of hydrophobic molecules 179 for attracting a non-mineral particle 172'. The non-mineral particle 172' has a particle body 171' with one or more hydrophobic molecular segments 76 attached thereto. The hydrophobic end or molecular segment 76 is attracted to the hydrophobic molecules 179 on the polymer surface 174. The term "polymer" in this specification means a large molecule made of many units of the same or similar structure linked together. Furthermore, the polymer associated with FIGS. 13*a*-13*c* can be naturally hydrophobic or functionalized to be hydrophobic. Some polymers having a long hydrocarbon chain or silicon-oxygen backbone, for example, tend to be hydrophobic. Hydrophobic polymers include polystyrene, poly(d,l-lactide), poly(dimethylsiloxane), polypropylene, polyacrylic, polyethylene, etc. The bubbles or beads, such as synthetic bead 170 can be made of glass to be coated with hydrophobic silicone polymer including polysiloxanates so that the bubbles or beads become hydrophobic. The bubbles or beads can be made of metal to be coated with silicone alkyd copolymer, for example, so as to render the bubbles or beads hydrophobic. The bubbles or beads can be made of ceramic to be coated with fluoroalkylsilane, for example, so as to render the bubbles and beads hydrophobic. The bubbles or beads can be made of hydrophobic polymers, such as polystyrene and polypropylene to provide a hydrophobic surface.

A Physical Property

For the purpose of describing and understanding the present invention, a physical property is understood to be any quality that is a measurable whose value describes a physical system's state. Changes in the physical properties of a system can be used to describe its transformations (or evolutions between its momentary states). Physical properties can be intensive or extensive, where an intensive property does not depend on the size or amount of matter in the object, while an extensive property does. Physical properties are contrasted with chemical properties which determine the way a material behaves in a chemical reaction. Physical properties are properties that do not change the chemical nature of matter.

By way of example, the present invention is described in relation to physical property of the synthetic beads or bubbles that take the form of size, weight, magnetism and density. However, embodiments of the present invention are envisioned using other types or kinds of physical properties either now known or later developed in the future, including electrostatic charge, as well as other types or kinds of physical properties that would allow, or provide for, the synthetic bead having the valuable material attached thereto to be separated from the mixture based at least partly on a difference in the physical property between the enriched synthetic bubbles or beads having the valuable material attached thereto and the mixture, consistent with that set forth herein.

Applications

The scope of the invention is described in relation to mineral separation, including the separation of copper or other minerals from ore.

By way of example, applications are envisioned to include rougher, scavenger, cleaner and rougher/scavenger separation cells in the production stream, replacing, supplementing or modifying the traditional flotation machines.

Tailings scavenger cells are used to scavenge the unrecovered minerals from a tailings stream.

Tailings cleaning cell is used to clean unwanted material from the tailings stream before it is sent to the disposal pond.

Tailings reclamation machine that is placed in the tailings pond or otherwise used to recover valuable mineral that has been sent to the tailings pond.

In a typical mineral separation process, an ore is blasted into manageable pieces of mineral-containing rock. The blasted ore is then subjected to grinding where the rock is crushed into small particles in the order of 100 µm. The particles are referred herein as mineral particles but they also contain silicate minerals or oxide minerals of little or no value. These mineral particles, along with gangue minerals, are mixed with water into a pulp slurry. The synthetic beads, according to some embodiments of the present invention, are used to attract the mineral particles to the bead surface. The enriched synthetic beads, which are the synthetic beads having the mineral particles attached thereon, are then separated from the unwanted rock or gangue minerals by means of size-based separation, weight-based separation and/or magnetic-based separation. For example, the separation can take place in a flotation cell, in a pipeline where the pulp slurry is transported from one location to another location, and in a mixing vat. Thereafter the mineral particles attached to the enriched synthetic beads are released from the synthetic beads for further processing, such as smelting. The releasing of the mineral particles from the synthetic beads can be carried out in different manners. For example, the enriched synthetic beads can be configured to contact a solution with a low pH value that interrupts or weakens the bonds between the mineral particles and the bead surfaces. It is also possible to submerge the enriched synthetic beads in a solution where ultrasonic waves are used to shake loose the mineral particles from the bead surface. The releasing can be carried out thermally or electromagnetically. For example, the enriched synthetic beads can be subjected to a hot-water wash to weaken the chemical bond of the functional groups. The enriched synthetic beads can also be subjected to laser illumination where a selected laser frequency is used to weaken the chemical bond. After the releasing process, the reclaimed synthetic beads can be reused or discarded. The reclaimed synthetic beads may be recharged in order to replenish the functional groups lost during the separation and releasing processes. In order to determine whether the reclaimed synthetic beads are reusable or worth recharging, a fluorescent chemical can be incorporated onto the surface of the synthetic beads together with the functional groups. The fluorescent chemical is used as a tag for tracing such that the intensity of the fluorescence can be used as a gauge when the fluorescent chemical is excited.

The synthetic beads, according to some embodiments of the present invention, can also be used in a dry separation process where the crushed particles are configured to contact with the synthetic beads by dry mixing. Alternatively, the synthetic beads can be contained in a filter and the crushed particles are forced by forced air to pass through the filter. Again, the mineral particles attached on the enriched synthetic beads can be released in a low pH environment, in a ultrasonic agitation environment, in a hot water bath or in a laser illuminated area.

The synthetic beads, according to some embodiments of the present invention, can be made with different sizes in order to attract mineral particles of different sizes. For example, unlike air bubbles, the synthetic beads of a larger size can be used to attract mineral particles larger than, say, 200 µm. Thus, the grinding of the blasted ore can be separated into different stages. In the first stage, the rock is crushed into particles in the order of 200 µm. After the separation process using the larger synthetic beads in the slurry containing these crude particles, the remaining slurry can be subjected to a finer grinding stage where the crushed rock is further crushed into particles in the order of 100 µm. With the slurry containing the finer mineral particles, synthetic beads with a smaller size may be more effective in interacting with the finer mineral particles. In a flotation cell application, the bead size can be smaller than 100 µm. In a tailings pond application, the bead size can be 1 mm to 10 mm or larger. However, large beads would reduce the functionalized surfaces where the mineral particles can attach to the synthetic beads. Thus, according to some embodiments of the present invention, the synthetic beads are configured with a size less than 100 µm for attracting to mineral particles having a substantially similar size, including in applications related to flotation cells; the synthetic beads are configured with a size of about 100 µm for attracting or attaching to mineral particles having a substantially similar size, smaller size or larger size; the synthetic beads are configured with a size in a range of about 50-500 µm for attracting or attaching to mineral particles having a substantially similar size, smaller size or larger size; the synthetic beads are configured with a size about 200 µm for attracting to mineral particles having a substantially similar size; the synthetic beads are configured with a size in a range of about 1 mm to 10 mm, including in applications related to a tailings pond. In general, the synthetic beads are configured with a size in a range of about 50 µm to 10 mm. But the beads can be smaller than 50 µm and larger than 10 mm.

Figure 14B:
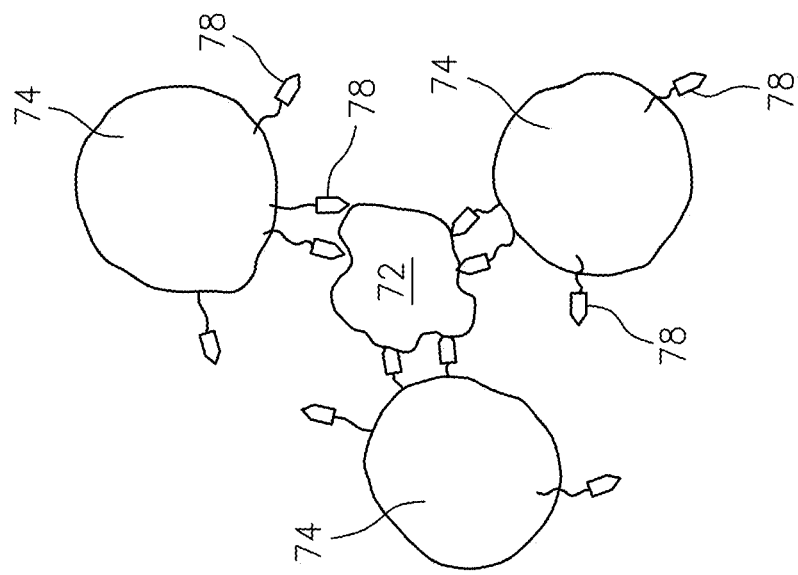
FIG. 14b illustrates a mineral particle being attached to a number of slightly larger synthetic beads at the same time.
Figure 14A:
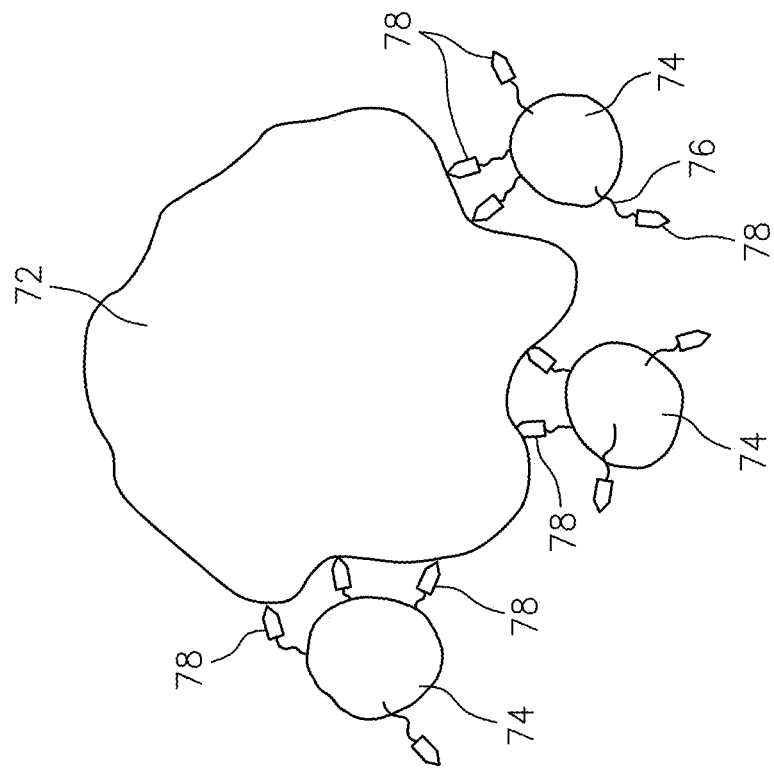
FIG. 14a illustrates a mineral particle being attached to a number of much smaller synthetic beads at the same time.

FIG. 14a illustrates a scenario where a mineral particle 72 is attached to a number of synthetic beads 74 at the same time. Thus, although the synthetic beads 74 are much smaller in size than the mineral particle 72, a number of synthetic beads 74 may be able to lift the mineral particle 72 upward in a flotation cell. Likewise, a smaller mineral particle 72 can also be lifted upward by a number of synthetic beads 74 as shown in FIG. 14*b*. In order to increase the likelihood for this "cooperative" lifting to occur, a large number of synthetic beads 74 can be mixed into the slurry. Unlike air bubbles, the density of the synthetic beads can be chosen such that the synthetic beads may stay along in the slurry before they rise to surface in a flotation cell.

Figure 15A:
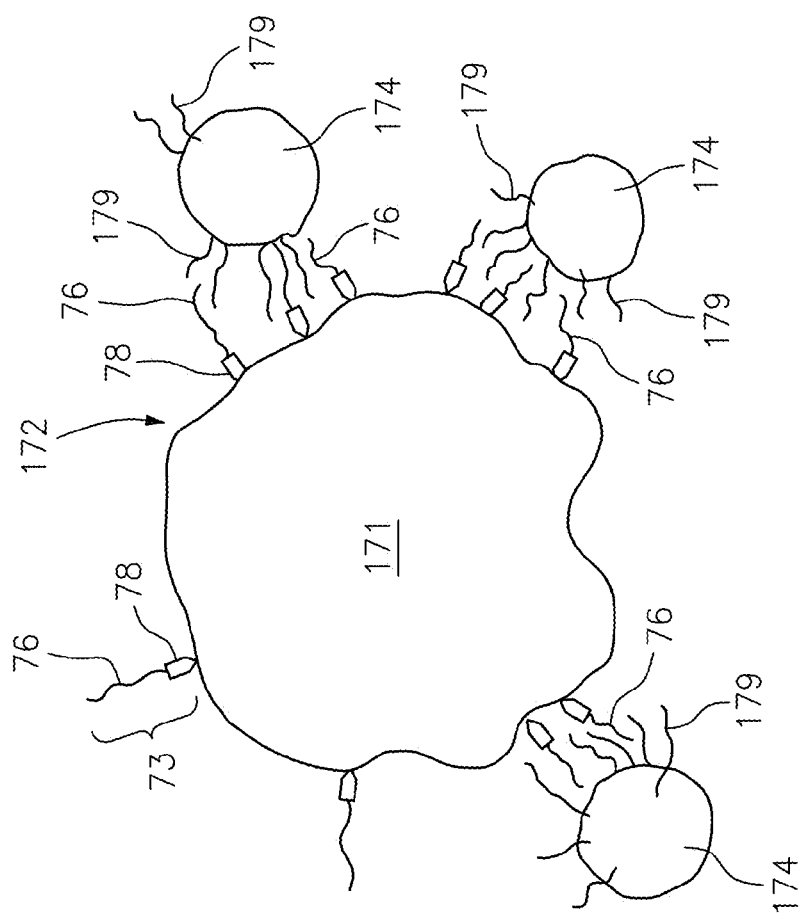
FIG. 15a illustrates a wetted mineral particle being attached to a number of much smaller hydrophobic synthetic beads at the same time.
Figure 15B:
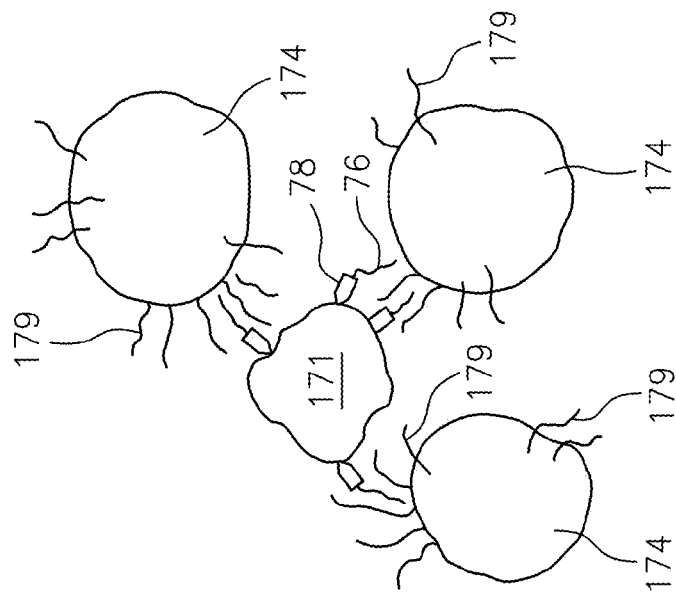
FIG. 15b illustrates a wetted mineral particle being attached to a number of slightly larger hydrophobic synthetic beads at the same time.

FIGS. 15*a* and 15*b* illustrate a similar scenario. As shown, a wetted mineral particle 172 is attached to a number of hydrophobic synthetic beads 174 at the same time, according to some embodiments of the present invention.

According to some embodiments of the present invention, the synthetic beads 74, 174 are configured to be larger than the mineral particles 72,172 as shown in FIGS. 7*a* and 13*a*. As such, a plurality of mineral particles 72, 172 may attach to one synthetic bead 74, 174. According to other embodiments of the present invention, the synthetic beads 74, 174 are configured to be smaller than the mineral particles 71, 171 as shown in FIGS. 14*a* and 15*a* As such, a plurality of synthetic beads 74, 174 may attach to one mineral particle 71, 171. The size of the synthetic beads 74, 174 can also be about the same as the size of the mineral particle 71, 171 as shown in FIGS. 14*b* and 15*b*. According to some embodiments of the present invention, only a portion of the surface of the synthetic bead 174 is functionalized to be hydrophobic (with molecules 179). This has the benefits as follows:

1. Keeps too many beads from clumping together—or limits the clumping of beads,
2. Once a mineral is attached, the weight of the mineral is likely to force the bead to rotate, allowing the bead to be located under the bead as it rises through the flotation cell;
   a. Better cleaning as it may let the gangue to pass through,
   b. Protects the attached mineral particle or particles from being knocked off, and
   c. Provides clearer rise to the top collection zone in the flotation cell.

According to some embodiments of the present invention, only a portion of the surface of the synthetic bead 74 is functionalized to have a functional group being a collector 78. The collector 78 has an ion for bonding to a mineral particle. This has the benefits as follows:

Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

According to some embodiments of the present invention, one part of the synthetic bead is functionalized with collectors while another part of same synthetic bead is functionalized to be hydrophobic as shown in FIGS. 16*a* and 16*b*. As shown in FIG. 16*a*, a synthetic bead 74 has a surface portion where polymer is functionalized to have collector molecules 73 with functional group 78 and molecular segment 76 attached to the surface of the bead 74. The synthetic bead 74 also has a different surface portion where polymer is functionalized to have hydrophobic molecules 179. In the embodiment as shown in FIG. 16*b*, the entire surface of the synthetic bead 74 can be functionalized to have collector molecules 73, but a portion of the surface is functionalized to have hydrophobic molecules 179 render it hydrophobic.

According to some embodiments of the present invention, one part of the synthetic bead is functionalized with collectors while another part of same synthetic bead is functionalized to be hydrophobic and this "hybrid" synthetic bead is configured for use in a traditional flotation cell as well. The "hybrid" synthetic bead (see FIGS. 16*a* and 16*b*) has a hydrophobic portion and a separate collector portion. When the "hybrid" beads are mixed with air in the flotation cell, some of them will attach to the air bubbles because of the hydrophobic portion. As the "hybrid" synthetic bead is attached to an air bubble, the collector portion of the attached bead can collect mineral particles with the functional groups. Thus, the synthetic beads, according to some embodiments of the present inventions, can be used to replace the air bubbles, or to work together with the air bubbles in a flotation process.

This "hybrid" synthetic bead can collect mineral particles that are wet and not wet.

It should be noted that, the synthetic beads, according to some embodiments of the present invention, can be used in tailings scavenger cells to scavenge the unrecovered minerals from a tailings stream. The synthetic beads can also be used in a disposal pond or the tailing ponds.

It should be understood that the synthetic beads according to the present invention, whether functionalized to have a collector or functionalized to be hydrophobic, are also configured for use in oilsands separation—to separate bitumen from sand and water in the recovery of bitumen in an oilsands mining operation. Likewise, the functionalized filters and membranes, according to some embodiments of the present invention, are also configured for oilsands separation.

As described in the specification, ore mining is typically associated with copper and nickel. However, other types or kinds of valuable material or minerals of interest, including gold, molybdenum, etc.

However, the scope of the invention is intended to include other types or kinds of applications either now known or later developed in the future.

Silicone Gel

By way of example, the positively charged polymers may be coated with a silicone gel for collecting the valuable material of interest of a wide range of sizes, including particles far larger than about 500 microns. After being coated on the positively charged polymers, the silicone gel will cure and harden to as to form part of, and stick to, the positively charged polymers. The silicone gel may include, or take the form of, molecules having the siloxane functional group, e.g., including a siloxane that is, or may take the form of, a functional group in organosilicon chemistry with the Si—O—Si linkage. By way of example, parent siloxanes may include, or take the form of, oligomeric and polymeric hydrides with the formulae $H(OSiH_2)_nOH$ and $(OSiH_2)_n$. The scope of the invention is also intended to include other types or kinds of siloxanes either now known or later developed in the future, e.g., including branched compounds, where the defining feature includes each pair of silicon centers being separated by one oxygen atom. In one embodiment of the present invention, and set forth by way of example, the silicone gel may take the form of a product from Dow-Corning® Corporation, Midland, Mich. 48686-0994, USA, e.g., labeled as product no. 2986922-1104 (Lot: 0007137499), that is sold in a combination that includes 3-4222 Dielectric Firm Gel Part A and 3-4222 Dielectric Firm Gel Part B. The gel comes with two parts: Part A includes dimethyl siloxane, dimethylvinyl-terminated 68083-19-2; polydimethylsiloxane 63148-62-9; reaction of ethylene glycol and silica—170424-65-4; hydrotreated light naphthenic petroleum distillate—64742-53-6. Part B includes dimethyl siloxane, dimethylvinyl-terminated—68083-19-2; polydimethylsiloxane 63148-62-9; dimethyl siloxane, hydrogen-terminated—none; trimethylated silica—68909-20-6; dimethyl, methylhydrogen siloxane—68037-59-2.

The Scope of the Invention

It should be further appreciated that any of the features, characteristics, alternatives or modifications described regarding a particular embodiment herein may also be applied, used, or incorporated with any other embodiment described herein. Although the invention has been described and illustrated with respect to exemplary embodiments thereof, the foregoing and various other additions and omissions may be made therein and thereto without departing from the spirit and scope of the present invention.

What is claimed is:

1. An apparatus comprising:
   a synthetic bead having a solid-phase body with a surface, and being configured with a predetermined electric charge so as to respond to a corresponding predetermined electric field; and
   a plurality of molecules attached to at least part of the surface, the molecules comprising a functional group selected for attracting and attaching one or more mineral particles of interest to the molecules, wherein the surface is made of a polymer functionalized with the molecules, and wherein the polymer is selected from a group consisting of poly(dimethylsiloxane), polysiloxanates, silicone alkyd copolymer and fluoroalkylsilane.

2. The apparatus according to claim 1, wherein some combination of the solid-phase body or the surface is configured from polyethylenimine.

3. The apparatus according to claim 2, wherein the polyethylenimine is engineered or configured to be highly charged so as to be used to collect the mineral particles of interest and then manipulated through and by the corresponding predetermined electric field.

4. The apparatus according to claim 1, wherein the apparatus comprises a flotation tank configured between a top charged metal plate having a first polarity and a bottom charged metal plate having a second polarity opposite to the first polarity, and also configured to be filled with and contain a solution or slurry having synthetic beads in the form of charged polymers having the first polarity, embedded collectors, and a mineral slurry having the mineral particles of interest, the top charged metal plate and the bottom charged metal plate being configured to generate the corresponding predetermined electric field in the mineral slurry in order to manipulate the charged polymers.

5. The apparatus according to claim 4, wherein the top charged, metal plate and the bottom charged metal plate are configured to cause the charged polymers, along with the one or more mineral particles of interest that may be attached thereto, to migrate through the mineral slurry to the top charged metal plate, based at least partly on the predetermined electric field.

6. The apparatus according to claim 4, herein the top metal plate is configured with a negative charge and configured, arranged or placed over the flotation tank, the bottom charged metal plate is configured with a positive charge and configured, arranged or located under the flotation tank, and the charged polymers are configured with a corresponding positive charge.

7. The apparatus according to claim 1, wherein the solid-phase body comprises a shell providing the surface, the shell made of the polymer functionalized with the molecules.

8. The apparatus according to claim 7, wherein the synthetic bead is configured to attract the mineral particles in an aqueous mixture, and wherein the shell comprises an interior part arranged to encapsulate a gaseous element such that the bead has a density smaller than the aqueous mixture.

9. The apparatus according to claim 7, wherein the synthetic bead is configured to attract or attach to the mineral particles in an aqueous mixture, and wherein the shell comprises an interior part arranged to encapsulate a liquid having a chemical property different from the aqueous mixture.

10. The apparatus bead according to claim 7, wherein the synthetic bead is configured to attract the mineral particles in an aqueous mixture, and wherein the shell comprises an interior part arranged to encapsulate a solid-phase material different from the synthetic material, and the solid-phase material is selected to control the density of the synthetic bead relative to the density of the aqueous mixture.

11. The apparatus according to claim 7, wherein the shell comprises an interior part configured to encapsulate a magnetic material.

12. The apparatus according to claim 7, wherein the shell comprises an interior part configured to encapsulate a solid-phase material different from the synthetic material.

13. The apparatus according to claim 1, wherein the solid-phase body comprises a core and a coating over the core for providing the surface, wherein the coating is made of the polymer functionalized with the molecules and the core is made of a core material different from said polymer.

14. The apparatus according to claim 13, wherein the core material is selected from a group consisting of glass, ceramic, metal and a polymer that is different than the polymer functionalized with the molecules.

15. The apparatus according to claim 1, wherein the surface comprises physical structures configured to trap the mineral particles.

16. The apparatus according to claim 15, wherein the physical structures comprise grooves or dents.

17. The apparatus according to claim 15, wherein the physical structures comprise hair-like structures.

18. The apparatus according to claim 1, wherein the mineral particles of interest have a maximum size and the solid-phase body has a body size greater than the maximum size.

19. The apparatus according to claim 1, wherein the mineral particles have a minimum size and the solid-phase body has a body size smaller than the minimum size.

20. The apparatus according to claim 1, wherein the functional group has an anion for attracting the mineral particles of interest to the surface.

21. The apparatus according to claim 1, wherein the functional group is a collector that is either ionic or non-ionic.

22. The apparatus according to claim 21, wherein the functional group is anionic or cationic, and wherein the anion comprises an oxyhydryl, including carboxylic, sulfates and sulfonates, and sulfhydryl bond.

23. The apparatus according to claim 1, wherein the synthetic bead is configured with a size less than 100 μm for attracting to mineral particles having a substantially similar size, including in applications related to flotation cells.

24. The apparatus according to claim 1, wherein the synthetic bead is configured with a size of about 100 μm for attracting or attaching to mineral particles having a substantially similar size, smaller size or larger size.

25. The apparatus according to claim 1, wherein the synthetic bead is configured with a size in a range of about 50-500 μm for attracting or attaching to mineral particles having a substantially similar size.

26. The apparatus according to claim 1, wherein the synthetic bead is configured with a size about 200 μm for attracting to mineral particles of interest having a substantially similar size.

27. The apparatus according to claim 1, wherein the synthetic bead is configured with a size in a range of about 1 mm to 10 mm, including in applications related to a tailings pond.

28. The apparatus according to claim 1, wherein the synthetic bead is configured with a size in a range of about 50 μm to 10 mm.

29. The apparatus according to claim 1, wherein the functional group is configured to cause the surface to be hydrophobic.

30. The apparatus according to claim 1, wherein the solid-phase body comprises a porous block providing the surface, the porous block made of a synthetic material comprising the molecules.

31. The apparatus according to claim 1, only said at least part of the surface is configured to have the molecules attached thereto, and another part of the surface comprises collectors.

32. A method comprising:
providing a synthetic bead or bubble having a solid-phase body with a surface, and being configured with a predetermined electric charge so as to respond to a corresponding predetermined electric field; and
attaching a plurality of molecules to the surface, the molecules comprising a functional group selected for attracting one or more mineral particles of interest to the molecules, wherein the surface is made of a polymer functionalized with the molecules, and wherein the polymer is selected from a group consisting of poly (dimethylsiloxane), polysiloxanates, silicone alkyd copolymer and fluoroalkylsilane.

33. The method according to claim 32, wherein the method comprises configuring some combination of the solid-phase body or the surface from polyethylenimine.

34. The method according to claim 33, wherein the method comprises engineering or configuring the polyethylenimine to be highly charged so as to be used to collect the mineral particles of interest and then manipulated through and by the corresponding predetermined electric field.

35. The method according to claim 32, wherein the method comprises
configuring a flotation tank between a top charged metal plate having a first polarity and a bottom charged metal plate having a second polarity opposite to the first polarity;
configuring the flotation tank to be filled with and contain a solution or slurry having synthetic beads in the form of charged polymers having the first polarity, embedded collectors, and a mineral slurry having the mineral particles of interest; and
configuring the top charged metal plate and the bottom charged metal plate to generate the corresponding predetermined electric field in the mineral slurry in order to manipulate the charged polymers.

36. The method according to claim 35, wherein the method comprises configuring the top charged metal plate and the bottom charged metal plate to cause the charged polymers, along with the one or more mineral particles of interest that may be attached thereto, to migrate through the mineral slurry to the top charged metal plate, based at least partly on the predetermined electric field.

37. The method according to claim 36, wherein the method comprises
configuring the top metal plate with a negative charge;
configuring, arranging or placing the top metal plate over the flotation tank;
configuring the bottom charged metal plate with a positive charge;
configuring, arranging or locating the bottom charged metal plate under the flotation tank; and
configuring the charged polymers with a corresponding positive charge.

38. An apparatus comprising:
synthetic bead or bubble means having a solid-phase body with a surface, and being configured with a predetermined electric charge so as to respond to a corresponding predetermined electric field; and
molecule means attached to at least part of the surface, the molecules means comprising a functional group selected for attracting and attaching one or more mineral particles of interest to the molecules, wherein the surface is made of a polymer functionalized with the molecules, and wherein the polymer is selected from a group consisting of poly(dimethylsiloxane), polysiloxanates, silicone alkyd copolymer and fluoroalkylsilane.

39. The apparatus according to claim 4, wherein the polarity of the top charged metal plate and the bottom charged metal plate is reversed periodically to force off any attached charged particles or polymers that did come in contact with the top charged metal plate and were held there, causing them to be released and to migrate in the direction of the bottom charged metal plate.

40. The method according to claim 35, wherein the method comprises reversing periodically the polarity of the top charged metal plate and the bottom charged metal plate to force off any attached charged particles or polymers that did come in contact with the top charged metal plate and were held there, causing them to be released and to migrate in the direction of the bottom charged metal plate.

41. The apparatus according to claim 7, wherein the synthetic bead is configured to attract or attach to the mineral particles in an aqueous mixture, and wherein the shell comprises an interior part arranged to encapsulate a depressant composition for the enhanced separation of copper, nickel, zinc, or lead in the sulfide ores.

* * * * *